(12) United States Patent  (10) Patent No.: US 8,849,703 B2
Ramaratnam et al.  (45) Date of Patent: Sep. 30, 2014

(54) PROCESSING ONLINE TRANSACTIONS

(75) Inventors: Arjun Ramaratnam, Fremont, CA (US); Kenneth Hansen, San Francisco, CA (US); Murad Dar, Centerton, AR (US); Puneet Srivastava, San Bruno, CA (US); Richard Brett Gerry, San Francisco, CA (US); Ruchitkumar A Shah, Sunnyvale, CA (US); Sathya N Dharaneedharan, Fremont, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/600,871

(22) Filed: Aug. 31, 2012

(65) Prior Publication Data

US 2013/0275240 A1  Oct. 17, 2013

Related U.S. Application Data

(60) Provisional application No. 61/624,975, filed on Apr. 16, 2012.

(51) Int. Cl.
*G06Q 30/00* (2012.01)
*G06Q 20/00* (2012.01)
*G06G 1/12* (2006.01)

(52) U.S. Cl.
USPC .... 705/20; 705/14.37; 705/14.38; 705/14.39; 705/21; 705/340

(58) Field of Classification Search
USPC ......................................................... 705/20
See application file for complete search history.

(56) References Cited

U.S. PATENT DOCUMENTS

| | | | | | |
|---|---|---|---|---|---|
| 5,053,957 | A | * | 10/1991 | Suzuki | 705/14.36 |
| 5,832,458 | A | * | 11/1998 | Jones | 705/14.26 |
| 5,984,508 | A | * | 11/1999 | Hurley | 700/237 |
| 6,016,480 | A | * | 1/2000 | Houvener et al. | 705/21 |
| 6,154,738 | A | * | 11/2000 | Call | 705/20 |
| 6,167,380 | A | * | 12/2000 | Kennedy et al. | 705/7.31 |

(Continued)

FOREIGN PATENT DOCUMENTS

| | | |
|---|---|---|
| EP | 2187349 A1 | 1/2008 |
| WO | WO 01/16768 A1 | 3/2001 |

OTHER PUBLICATIONS

Min, H. et al. (2006). The spatial and temporal consolidation of returned products in a closed-loop supply chain network. Computers & industrial Engineering 51, pp. 309-320 ("Min").*

(Continued)

*Primary Examiner* — Seye Iwarere
*Assistant Examiner* — Peter L Ludwig
(74) *Attorney, Agent, or Firm* — David R. Stevens; Stevens Law Group

(57) ABSTRACT

Disclosed are systems and methods for managing transactions in which an order is specified online and payment is received at a point of sale (POS). Methods are disclosed for managing payment for such transactions at a POS, including transactions involving payment for both in-store purchases and online orders. Methods are also disclosed for managing inventory and price changes for such transactions where payment can occur at any time in a pay period following order creation. Also disclosed are methods for processing refunds for online orders for which payment was made at a POS. Finally, methods for preventing fraud and abuse as well as restricting the availability of this payment method for certain items are disclosed.

17 Claims, 24 Drawing Sheets

(56) References Cited

U.S. PATENT DOCUMENTS

| | | | |
|---|---|---|---|
| 6,338,067 B1* | 1/2002 | Baker et al. | 379/115.01 |
| 6,460,025 B1* | 10/2002 | Fohn et al. | 706/45 |
| 7,076,449 B2* | 7/2006 | Tsunenari et al. | 705/26.1 |
| 7,257,554 B1 | 8/2007 | Glassman et al. | |
| 7,308,421 B2* | 12/2007 | Raghupathy et al. | 705/20 |
| 7,455,226 B1* | 11/2008 | Hammond et al. | 235/385 |
| 7,464,226 B2* | 12/2008 | Reinertsen | 711/118 |
| 7,529,709 B2 | 5/2009 | Volchek et al. | |
| 7,593,898 B1 | 9/2009 | Tsuei et al. | |
| 7,617,520 B2* | 11/2009 | Naizhen et al. | 726/1 |
| 7,644,041 B1 | 1/2010 | Schultz | |
| 7,716,091 B2* | 5/2010 | Ross | 705/28 |
| 7,797,271 B1* | 9/2010 | Bonneau et al. | 705/343 |
| 7,870,029 B2 | 1/2011 | Bates et al. | |
| 7,881,986 B1 | 2/2011 | Pape | |
| 7,969,884 B1* | 6/2011 | Venables et al. | 370/235 |
| 7,979,445 B2* | 7/2011 | Mason | 707/748 |
| 8,099,779 B2* | 1/2012 | Owen et al. | 726/17 |
| 8,103,520 B2 | 1/2012 | Mueller et al. | |
| 8,311,899 B1* | 11/2012 | Barton | 705/26.8 |
| 8,321,271 B2* | 11/2012 | LeFebvre | 705/14.34 |
| 8,332,282 B2* | 12/2012 | Siegel | 705/26.8 |
| 8,332,428 B2* | 12/2012 | Bonneau et al. | 707/772 |
| 2002/0010634 A1* | 1/2002 | Roman et al. | 705/26 |
| 2002/0019785 A1* | 2/2002 | Whitman | 705/28 |
| 2002/0046056 A1* | 4/2002 | Demarco et al. | 705/1 |
| 2002/0072956 A1* | 6/2002 | Willems et al. | 705/10 |
| 2004/0002901 A1 | 1/2004 | Baker | |
| 2004/0128265 A1* | 7/2004 | Holtz et al. | 705/406 |
| 2004/0162906 A1* | 8/2004 | Griffin et al. | 709/229 |
| 2004/0172260 A1* | 9/2004 | Junger et al. | 705/1 |
| 2005/0049927 A1* | 3/2005 | Zelanis et al. | 705/26 |
| 2006/0095346 A1 | 5/2006 | Gambhir | |
| 2006/0206385 A1* | 9/2006 | Walker et al. | 705/21 |
| 2007/0008102 A1* | 1/2007 | Fallin et al. | 340/506 |
| 2007/0112664 A1 | 5/2007 | Zhang | |
| 2007/0255619 A1* | 11/2007 | Ekchian | 705/14 |
| 2008/0052184 A1* | 2/2008 | Junger et al. | 705/26 |
| 2008/0208716 A1* | 8/2008 | Grove et al. | 705/27 |
| 2009/0048934 A1* | 2/2009 | Haddad et al. | 705/17 |
| 2009/0099971 A1 | 4/2009 | Salemme | |
| 2009/0240624 A1* | 9/2009 | James et al. | 705/44 |
| 2010/0205541 A1* | 8/2010 | Rapaport et al. | 715/753 |
| 2010/0280843 A1 | 11/2010 | Beraja et al. | |
| 2011/0082799 A1 | 4/2011 | Parduhn et al. | |
| 2011/0131105 A1* | 6/2011 | Aonuma et al. | 705/24 |
| 2011/0225063 A1* | 9/2011 | Grunski et al. | 705/26.8 |
| 2011/0265162 A1* | 10/2011 | Alavandar et al. | 726/7 |
| 2012/0290477 A1 | 11/2012 | Clausen | |

OTHER PUBLICATIONS

Speights, D. et al. (2005). Return Fraud and Abuse: how to protect profits. Retailing Issues Letter 17(1). White paper.*

Sauers, J. (2010). Retailers are watching you with new tracking program. Retail Hell.*

Mukhopadhyay, S. & Setaputra, R. (2006). The role of 4PL as the reverse logistics integrator. Int'l J. of Physical Distribution & logistics Management 36(9), pp. 716-729.*

Case Study (Jun. 2011): Slimming Down Return Fraud. The Retail Equation.*

"Wal-Mart introduces price matching", CNN Money, by Jessica Dickler, Oct. 24, 2011.

"Annual Field Guide to Alternative Payments",Digital Transactions, by John Stewart, Jim Daly, and Linda Punch, May 1, 2011.

Amazon Pre-Order Price Guarantee, Apr. 8, 2009.

ZenCart, Jul. 22, 2011.

PayNearMe (formerly Kwedit), earliest website found Feb. 7, 2010 for Kwedit.com.

* cited by examiner

PROCESSING ONLINE TRANSACTIONS

RELATED APPLICATIONS

This application claims priority to U.S. Provisional Application Ser. No. 61/624,975 filed Apr. 16, 2012 and entitled Novel Approach to Making Payments, which is hereby incorporated herein by reference in its entirety. This application is also related to U.S. application Ser. No. 13/600,821, filed Aug. 31, 2012, U.S. application Ser. No. 13/600,841, filed Aug. 31, 2012, U.S. application Ser. No. 13/600,886, filed Aug. 31, 2012, U.S. application Ser. No. 13/600,900, filed Aug. 31, 2012, U.S. application Ser. No. 13/600,920, filed Aug. 31, 2012, U.S. application Ser. No. 13/600,957, filed Aug. 31, 2012, U.S. application Ser. No. 13/601,013, filed Aug. 31, 2012, and U.S. application Ser. No. 13/601,029, filed Aug. 31, 2012. All applications are incorporated herein by reference for all purposes.

BACKGROUND

1. Field of the Invention

This invention relates to receiving payment for online purchases.

2. Background of the Invention

In ecommerce transactions, the typical payment method is a credit or debit card. Other electronic accounts may also be used to pay for an online purchase, but these accounts are typically linked to some sort of bank or credit account. These payment methods result in additional costs due to transaction processing, fraud processing, and chargeback exposure.

There are also many "unbanked" and "under-banked" customers that do not have a credit or debit card and do not qualify for alternatives, but want to purchase items online. These customers typically pay with cash for in-store transactions. In addition, many potential customers are not comfortable entering their credit card information on a web site. In a third party survey of online users, 12-18% did not shop online. Of these users, 44% cited not wanting to share financial information online as the reason for refraining from online shopping.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
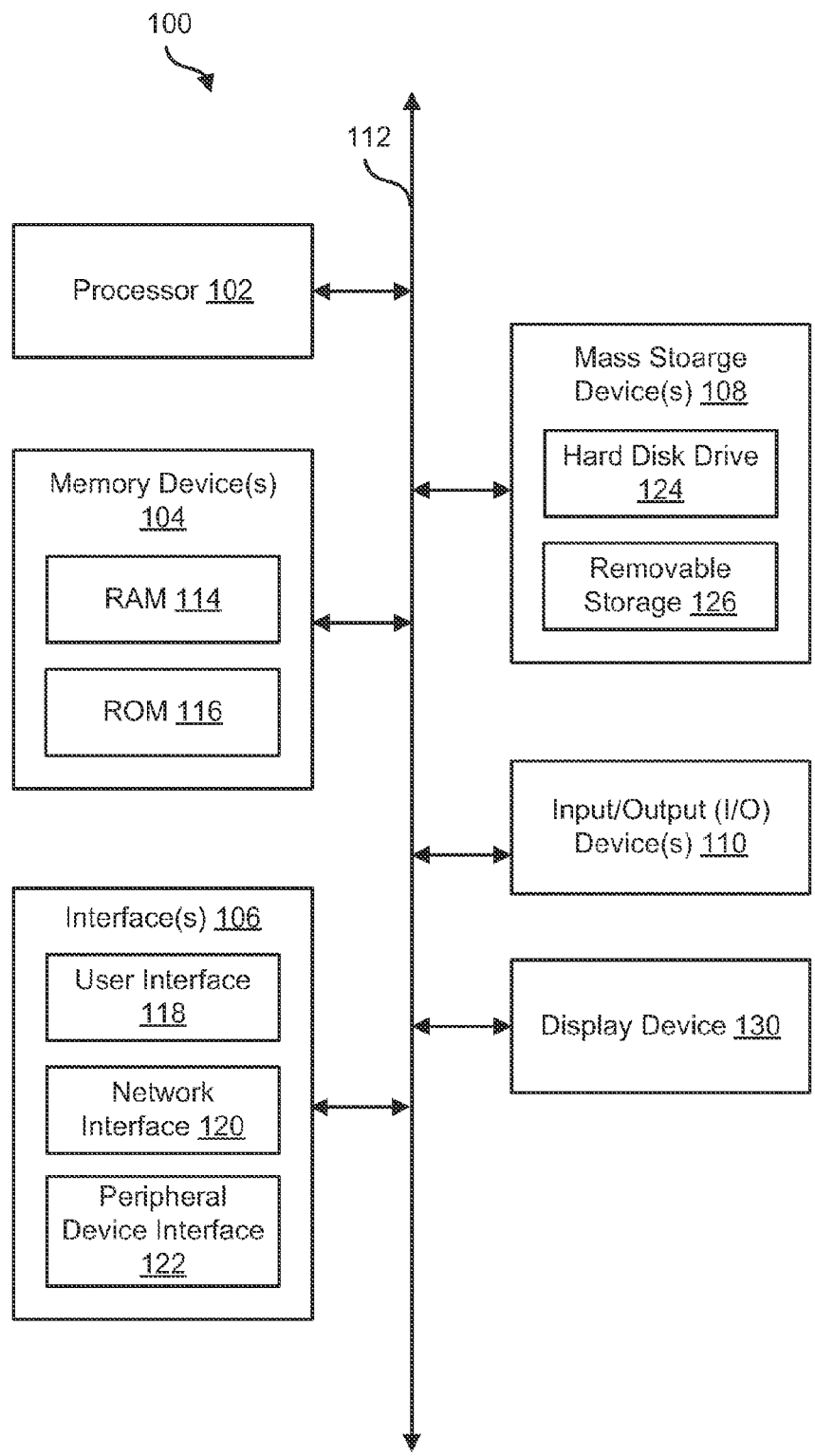
FIG. 1 is a block diagram of a computing device suitable for implementing embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for managing online transactions wherein an option is provided to pay for a transaction at a POS located in a store.

In one aspect an order is created online, such as by using a web browser, and POS payment is selected as the payment method. An order identifier may be transmitted to the customer, who then presents the order identifier at a POS. The POS retrieves order information for the order identifier and receives payment of a purchase price for the order. The POS then transmits acknowledgment of payment of the purchase price to a merchant system that then authorizes fulfillment and otherwise processes the order.

Various methods for supporting these types of transactions are also disclosed and claimed herein. Included are methods for managing the actual transaction, as well as methods for processing refunds, managing inventory, restricting eligibility of items for this form of payment, preventing fraud and abuse, and managing other aspects of the transaction.

An embodiment in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects. Such embodiments may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the final scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, as well as the combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture. This article of manufacture will include instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus. to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

FIG. 1 is a block diagram illustrating an example computing device, labeled computing device 100. Computing device 100 may be used to perform various procedures, such as those discussed herein. Computing device 100 can function as a server, a client, or any other computing entity. It can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more input/output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements like user interface 118. The interface(s) 106 may also include one or more peripheral interfaces, such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as with other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100 and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
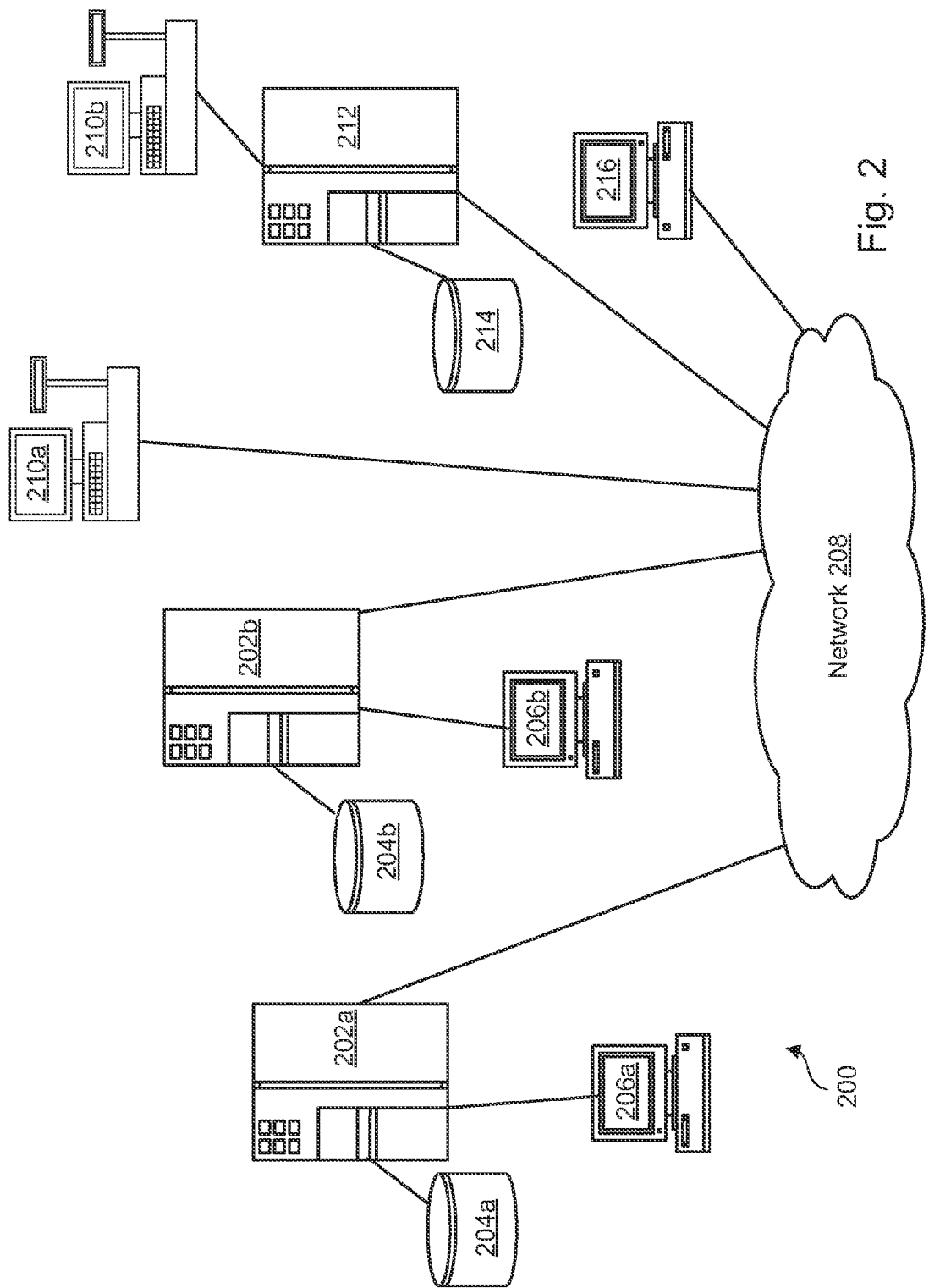
FIG. 2 is a block diagram of a network environment suitable for implementing embodiments of the present invention.

FIG. 2 illustrates an example of a network environment 200 suitable for implementing systems and methods described herein. The environment 200 may include one or more merchant systems 202a-202b. Each merchant system 202a-202b may be embodied as a server farm or multiple remote servers connected to one another by a network. A merchant system 202a-202b may have one or more databases 204a-204b associated therewith to store information regarding online or in-store activities, or both. The merchant systems 202a-202b may be owned or controlled by the same or different entities. Owners and employees may access the merchant systems 202a-202b by means of one or more workstations 206a-206b. The workstations 206a-206b may be embodied as general purpose computers, tablet computers, smart phones, terminals, or the like.

The merchant systems 202a-202b may connect to a network 208, which may include some or all of a local area network (LAN), wide area network (WAN), virtual private network (VPN), the Internet, and other networks.

One or more point of sale (POS) devices 210a-210b may also be operably connected to the network 208 and have the capacity to communicate with one or more of the merchant systems 202a-202b. Each POS device 210a-210b may be associated with a physical store. The store and corresponding POS device 210a-210b may be owned or controlled by the same entity owning or controlling one of the merchant systems 202a-202b. In some embodiments, a POS 210b is operably connected to a POS host 212. The POS host 212 may interface with the POS 210b to manage store transactions at one or more stores. The POS may also be an automated system, such as an automated teller machine (ATM) that is capable of receiving electronic and cash payments. As such, the POS, though often located in a store, may be located elsewhere. Accordingly, references to "in-store" payments at a POS may also be replaced by payment at an ATM or other facility, such as a bank or other financial or governmental institution. The POS host 212 may likewise interface with one of the merchant systems 202a-202b to provide information regarding POS transactions to the merchant system.

A POS, according to any of the aforementioned implementations, may be operable to scan barcodes. For purposes of this disclosure, references to barcodes and the scanning of barcodes may refer to a barcode received by email, multimedia messaging service (MMS) message, or other means. The barcode will then be reproduced by a customer on a printed page or on the screen of a mobile phone, tablet computer, or any other electronic device. Scanning of a barcode may be performed by scanning a screen of any of the foregoing devices or by scanning a reproduction of the barcode on a printed page.

A user workstation 216 may also connect to the network 208. The workstation 216 may be embodied as a general purpose computer, tablet computer, smart phone, or the like. The user workstation 216 may host a browser or other application enabling the ability to request and receive information from the merchant systems 202a-202b as well as the ability to transmit information to the merchant system 202a-202b, such as in the form of web pages and other content as known in the art.

Figure 3:
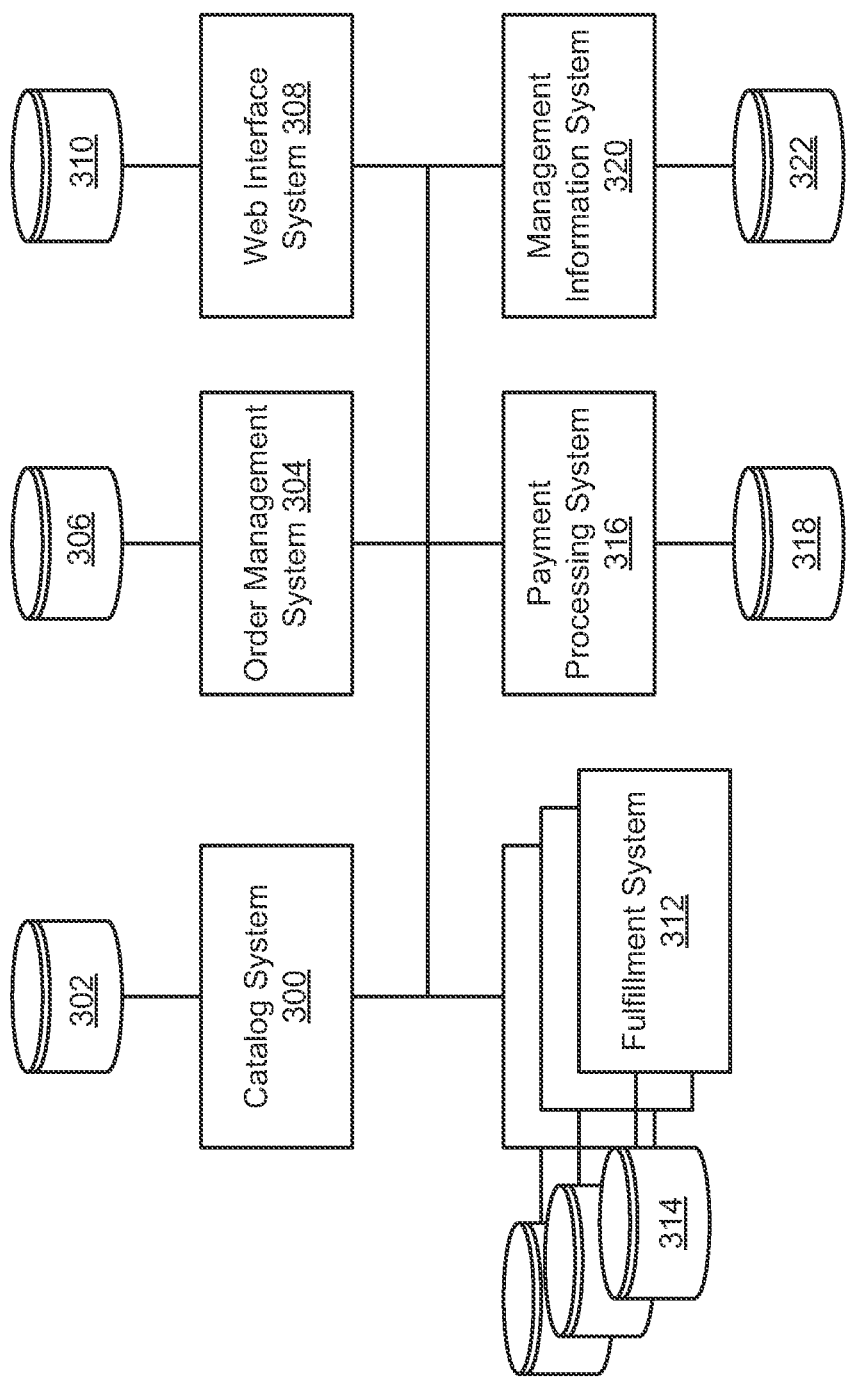
FIG. 3 is a block diagram of components for processing online transactions in accordance with embodiments of the present invention.

FIG. 3 illustrates an example of components that may be hosted by a merchant system 202a-202b. As noted above, a merchant system 202a-202b may include one or more servers. Accordingly, the functionality attributed to a component shown in FIG. 3 may likewise be implemented by a single server or shared between multiple servers. Similarly, a single server may implement all or part of the functionality of multiple components.

A merchant system 202a-202b may include a catalog system 300, which may have a catalog database 302 associated therewith. The catalog system 300 may store information regarding items for sale by the merchant. The catalog system 300 may list inventory for items offered for sale by the merchant. An order management system 304 may create orders for items in response to user requests and track the progress of orders. The order management system 304 may receive notifications from other components in order to update the status of an order. The order management system 304 may likewise transmit information and instructions to other components to facilitate payment and fulfillment of an order. An order database 306 may be associated with the order management system and include records for one or both of pending and concluded orders.

A web interface system 308 may provide an interface to a web browser executed on a client device. The web interface system 308 may enable online browsing of items for sale by a customer, receive customer requests to purchase items, receive payment information from customers, and perform other aspects of online commerce as known in the art. The web interface system 308 may have a web database 310 associated therewith. The web database 310 may include web pages, web application programming interfaces (APIs), scripts, and other data to facilitate conducting online transactions over a network by interfacing with a customer browser. The web database 310 may additionally store information regarding customer accounts and programs for managing the user accounts.

One or more fulfillment systems 312 manage the actual retrieval of items from inventory and shipping of items to customers. The fulfillment system 312 may receive instructions to ship items from the order management system 304. Each fulfillment system 312 may be associated with an actual fulfillment center that includes warehousing for inventory as well as personnel and equipment for packaging and shipping items to customers. A fulfillment system 312 may therefore include any and all computing resources and automated equipment to facilitate these functions. Each fulfillment system 312 may have a database 314 associated therewith that stores information about available inventory and the status of orders to be fulfilled. In some embodiments, a single common database 314 stores all information for multiple fulfillment systems 312.

A payment processing system 316 may interface with one or more financial institutions, check printing facilities, credit card companies, and other financial processing services or entities. The payment processing system 316 may receive user payments, issue refunds, or receive notification of payments or refunds from other entities. The payment processing system 316 may have a payment database 318 that may store information regarding past and pending payments, refunds, sales tax information, and other financial activities.

A management information system 320 collects information regarding activities of the other components and generates reports either automatically or upon management request. The management information system 320 may also monitor activities of other components and generate alerts based on analysis of these activities. The management information system 320 may have a database 322 associated therewith for storing historical data regarding past activities of the components.

Figure 4:
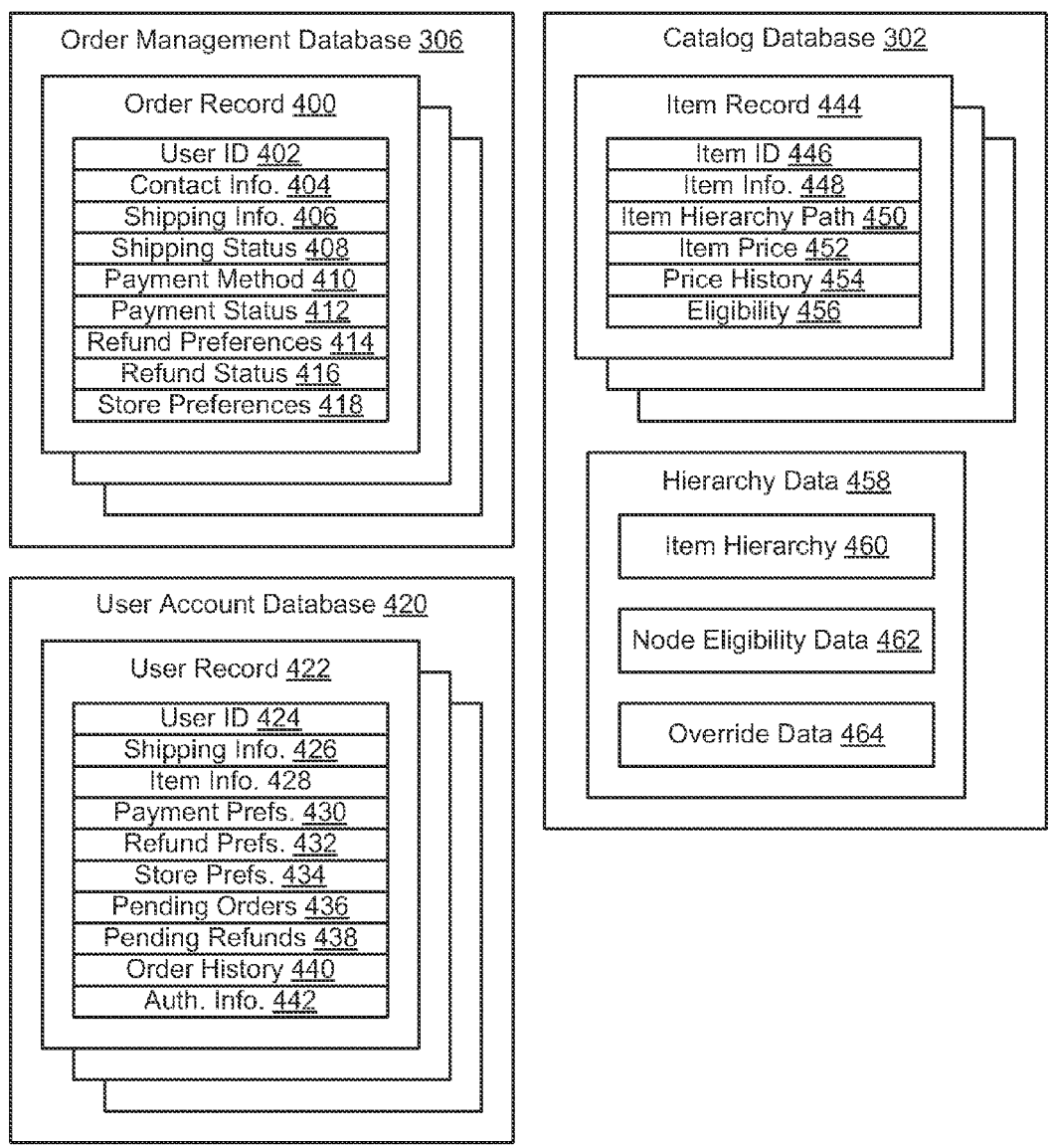
FIG. 4 is a block diagram of data structures for supporting processing online transactions in accordance with embodiments of the present invention.

FIG. 4 illustrates examples of records that may be generated or accessed by the components shown in FIG. 3. For example, the order database 306 may create and store order records 400 for pending orders and may retain the order records 400 after an order has concluded. The order records 400 may store information regarding an order such as a user identifier 402, which identifies the customer associated with an order and shipping information 404 for the order. The shipping information 404 may be associated with a user record corresponding to the user identifier 402, when this information is not included in the order record 400.

The order record 400 may additionally record item information 448 for the order. The item information 448 may identify one or more items associated with the order. Other item information may include a purchase price for an item, any discounts or coupons that apply to an item, and other item related information. The item information 406 may include an item identifier corresponding to an item record stored in a catalog database 302 or elsewhere.

The order record 400 may also include a shipping status 408 of the order. This may indicate whether the item is in process at a fulfillment center, waiting to be picked up by a carrier, in transit, arrived, or in some other stage of the shipping process.

The order record 400 may include a payment method 410 and payment status 412. As described in great detail herein, orders may be paid for by using conventional electronic payment (e.g., credit/debit card numbers) or by paying in cash at a point of sale (POS). Accordingly, the payment method 410 indicates which of these methods a customer has selected. As also described in greater detail below, in a pay-with-cash purchase, the customer is given a grace period to pay on an order at a POS. Accordingly, the payment status 412 may indicate whether payment at a POS has occurred.

An order record 400 may also have a refund preference 414 associated therewith. In a pay-with-cash order as described hereinbelow, a user pays for an order at a POS and therefore an electronic refund to a credit card may not be possible. Accordingly, the customer may choose to receive refunds by receiving a check in the mail or by picking up cash at a POS. The refund preference 414 indicates which of these options the customer prefers. The refund preference 414 may also include a mailing address if a check is requested or identify an authorized pick-up person if cash at a POS is selected.

A refund status 416 may indicate the status of a refund; for example, whether a check has been mailed, payment has been picked up at a POS, an electronic refund has been processed, or some other event relating to a refund has occurred. An order record may also store other information relating to an order, such as a store preference 418. The store preference 418 may indicate a store selected by a customer to pay for a purchase or receive payment of a refund.

Some or all of the information associated with an order record 400 may be retrieved from or linked to a user account database 420. The user account database 420 may be associated with users of an ecommerce website. Accordingly, the user account database 420 may be included in the web database 310. The user account database 420 may include user records 422 for current and past customers of a merchant. The user records 422 may include user preferences that are independent of a particular order or preferences that correspond with a customer's recent order. In some embodiments, the data of the user record can be retrieved and edited by a customer independent of placement of an order. User record data may also be edited in the course of an order.

The user record may include one or more of a user identifier 424, contact information 426, shipping information 426 and item information 428, payment preferences 430 such as pay at POS or electronic payment as described above, refund preferences 432 as described above, a preferred store 434, pending orders 436 for the customer, pending refunds 438, order history 440, and finally authentication information 442 such as a user name and password. The pending orders 436, pending refunds 438, and order history 440 may include links to corresponding order records 400. In some embodiments, some or all of this information may be maintained in the order management database 306 or other database, and linked to a user record 422 by means of the user ID 424.

A catalog database 302 may store item records 444. An item record 444 may store information such as an item ID 446 and item information 448 such as a description, reviews, related items, and other information of interest to a customer. The item record 444 may additionally store a path 450 to the item in an item categorization hierarchy. Alternatively, the item record 444 may contain no reference to a hierarchy and a hierarchy definition may be stored elsewhere. The item record 444 may also indicate one or both of a current price 452 and a price history 454. The price history 454 may record changes to the item price over time. An item record 444 may also indicate eligibility 456 of the item for various payment methods. In particular, the eligibility 456 may indicate whether a customer may choose to order the item online or pay for the item at a POS, as described in greater detail hereinbelow. The eligibility 456 may also indicate a quantity of the item or other restrictions that can be purchased by a user using online ordering with POS payment, such as described in greater detail hereinbelow.

The catalog database 302 may additionally include hierarchy data 458. The hierarchy data may define an item hierarchy 460, including classes and subclasses of items and assignments of particular items to particular classes and subclasses. For example, the class power tools could have a subclass of lawn equipment, and the subclass of lawn equipment could have its own subclass of lawnmowers. A particular lawnmower could then be an item assigned to this lawnmower subclass.

In some embodiments, eligibility of an item for online ordering with POS payment may be specified according to the hierarchy. For example, each class and subclass definition may be defined as a node in a hierarchical tree. Each node will have either descendent nodes or descendent items. Accordingly, defining the eligibility assigned to a node may be applied to all descendent nodes and items for that node. The definitions of the eligibility of nodes may be stored as node eligibility data 462. Exceptions and other overrides to any node eligibility definitions may be applied to specific descendent nodes and items. These overrides may be stored as override data 464.

Figure 5:
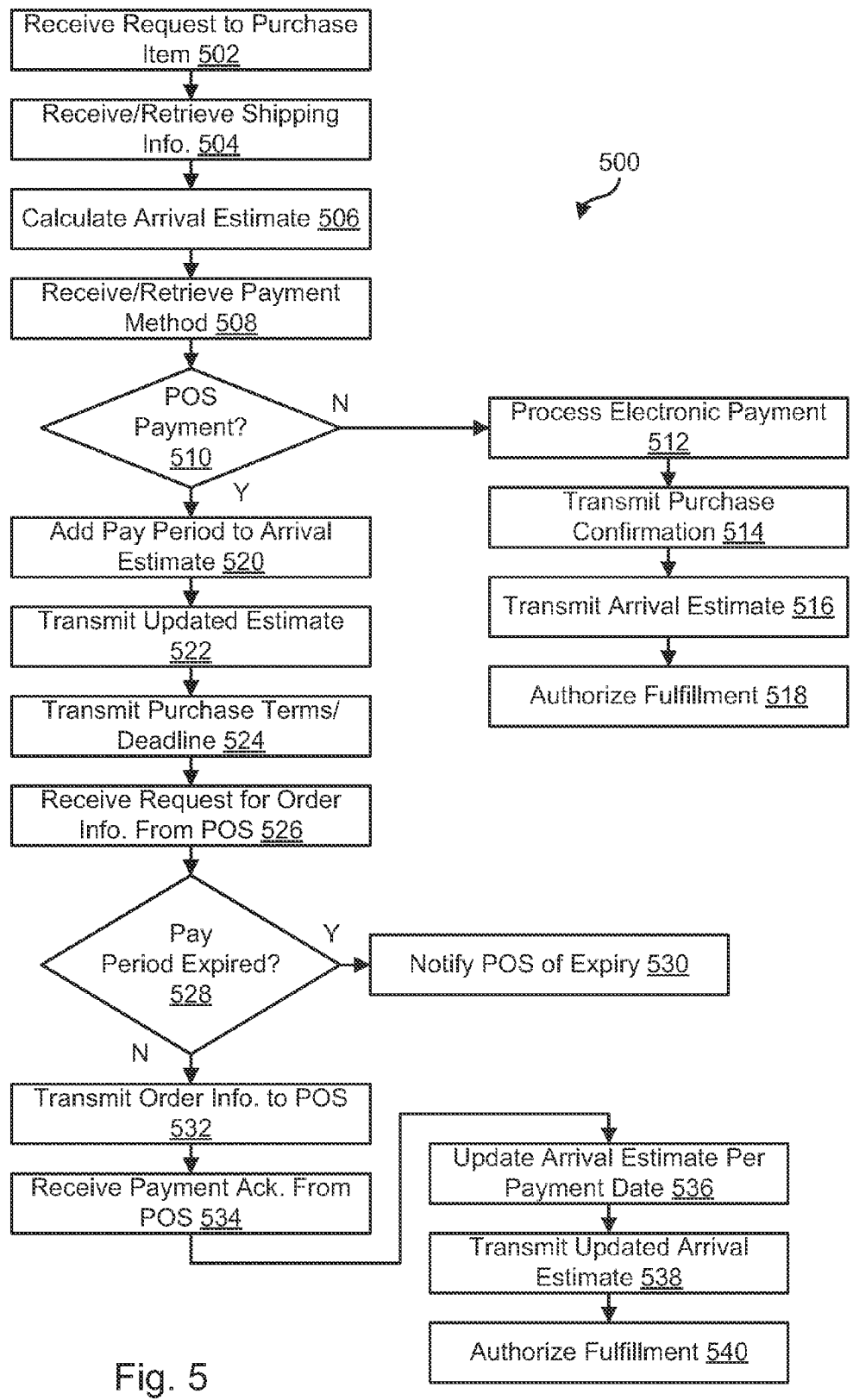
FIG. 5 is a process flow diagram of a method for processing an online transaction in accordance with an embodiment of the present invention.

FIG. 5 illustrates a method 500 for processing an online transaction. The method 500 may be performed by a merchant system 202a-202b, POS, some other device owned or controlled by a merchant, or a combination thereof. A request to purchase an item may be received 502, such as from a browser executing on a customer workstation 216. For the purposes of this application, communication with a customer may be interpreted as communication with a device associated with the customer, such as the customer workstation 216, an email server, or other device accessed by the customer. Specifically, messages to a customer may be transmitted to an open browser window or as an email, and messages from a customer may be received as inputs to a browser window or as an email.

Shipping information may also be received 504 from the customer or retrieved from existing records for the customer or order. An estimated arrival time may be calculated 506 for the item according to the shipping information. The arrival time may indicate an estimate of the time required for the item to arrive at a shipping location, such as the time it takes to locate the item at a fulfillment center, package the item, and ship the item to the address specified in the shipping information for a selected shipping method.

A payment method for the customer may be received 508 for the customer or retrieved from an existing record for the customer or order. Examples of payment methods include electronic payment (credit/debit card or other electronic account), a gift card or store credit card, or pay at a POS (e.g., pay with cash in store). For the purposes of this disclosure, "pay with cash" refers to payment at a POS for an online transaction. In some instances this option is designed to appeal to people who lack electronic banking accounts and therefore may prefer cash as their method of payment at the POS. However, the "pay with cash" option by means of payment at the POS in a store may also refer to payments at a POS made using a credit or debit card, check, store credit card, or other electronic account. In some applications, "point of sale" may refer to the functional unit that processes payment for online transactions. However, POS as used herein refers to a POS that is capable of accepting physical tender of cash or check payment, as well as electronic payment such as credit and debit cards. Such POS are typically located in a store and may be operated by a cashier. A POS may also be implemented as an automated device. An ATM, for example, is capable of interacting directly with a customer to receive payment.

If POS payment is not found 510 to be selected, the electronic payment is processed 512, and confirmation of purchase may be transmitted 514 to the customer. The calculated arrival estimate may also be transmitted 516 to the customer and fulfillment of the order is authorized 518 or otherwise initiated. Authorization of fulfillment may include transmitting order information such as one or more item identifiers and shipping information to a fulfillment center capable of packaging and shipping one or more items associated with the order.

If POS payment is found 510 to be selected then a "pay period" may be added 520 to the calculated arrival estimate. The pay period is the time period after which the order is made in which the customer must pay at a POS before the order is automatically canceled due to expiration. In some embodiments, the pay period includes an initial period plus a grace period. The initial period may be communicated to the customer whereas the grace period is an additional time interval after the initial period in which payment will be accepted if tendered at a POS.

The arrival estimate, as updated according to the pay period, may be transmitted 522 to the customer. Purchase terms, including a purchase price, the pay period, and any other purchase terms may be transmitted 524 to the customer. The pay period may be communicated as the date and/or time at which payment must be received at a POS before the order is automatically canceled.

The purchase terms may also include a barcode, order number, or other information used by the user to identify the order at a POS in a store. In some embodiments, a customer may specify a "payment person" indicating who is authorized to tender payment.

To pay for the order, a user may present one or more items of information to identify the online order. These may include a barcode, an order identifier, a customer phone number, customer name, or other identifying information. Upon receiving this information, a cashier may input the information to a POS 210a-210b. Alternatively, a user may enter the information at a self-checkout POS. In the case of a barcode, the POS may include a scanner and retrieve information by scanning the barcode.

Upon receiving this information, the POS may transmit the information to a merchant system 202a-202b or other device performing the method 500. The order identification information is received 526. The order corresponding to the order identification information may be evaluated 528 to determine whether the pay period has expired. If the payer period is found 528 to have expired, the POS may be notified 530 of expiry.

If the payer period is found 528 not to have expired, then order information may be transmitted 532 to the POS. In some embodiments, the methods disclosed herein may be performed in a batch processing scheme. For example, pending orders may be periodically evaluated to determine whether the pay period has expired. If so, then the order may be flagged as expired. Accordingly, evaluating 528 whether payment acknowledgment was received in the expiry period may include evaluating this flag.

The order information transmitted 532 may include a purchase price. The order information may also include an identity of an authorized payment person for the order. The POS may then receive tender of payment of the purchase price, which may include cash, check, or electronic payment. The POS may then transmit acknowledgment of payment to the merchant system 202a-202b. The merchant system 202a-202b receives 534 the acknowledgment of payment from the POS. In some embodiments, upon receiving acknowledgment of payment, the merchant system 202a-202b transmits an email or other message to the customer that acknowledges payment.

The updated arrival estimate calculated at step 520 may then again be updated 536 based on when acknowledgment of payment was received 534 from the POS. This may include calculating an expected arrival date based on initiation of fulfillment of the order as of the day acknowledgment of payment was received. This may include taking into account delays, which may occur due to backups at a selected fulfillment center, time required to retrieve and package the item(s), time required for a carrier to pick up the packaged item(s), estimated time in transit to the customer's specified shipping address, and any other factors relevant to variations in shipping time. The updated arrival estimate may then be transmitted 538 to the customer, such as by means of an email. Fulfillment of the order may then be authorized 540 or otherwise initiated. This may include transmitting order information, such as the item(s) of the order and the customer's shipping information to a fulfillment center.

Figure 6:
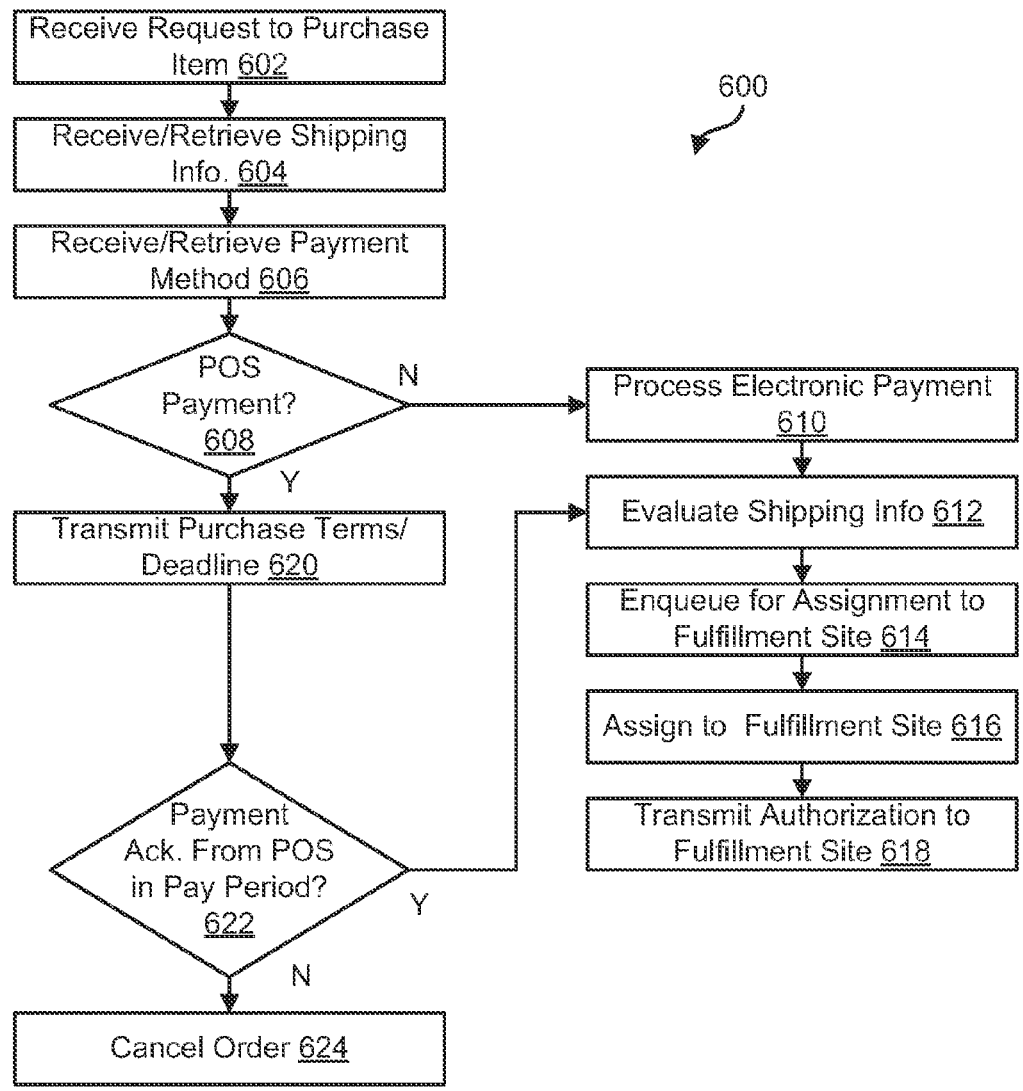
FIG. 6 is a process flow diagram of an alternative method for processing an online transaction in accordance with an embodiment of the present invention.

FIG. 6 illustrates another method 600 for processing an online transaction. The method 600 may be performed along with the method 500 and other methods described herein. The method 600 may be performed by a merchant system 202a-202b, POS, some other computing device, or a combination thereof. The method 600, as in the method 400, may include receiving 602 a request to purchase one or more items from a customer and receiving or retrieving 604 shipping information from a customer.

A payment method may also be received or retrieved 606 as described above. If the payment method is found 608 not to be a POS payment method, as described above, then electronic payment is processed 610 as known in the art. The shipping information may be evaluated 612 to determine an appropriate fulfillment centers and the order may be enqueued 614 for assignment to a fulfillment center. Orders may be processed on a first-in, first-out basis according to when they were added to the queue. Each order may be assigned 616 to a fulfillment center based on whether the fulfillment center has the order item(s) in stock, proximity of the fulfillment center to the shipping address, and backlog of unfulfilled orders assigned to the fulfillment center. Once a fulfillment center is selected 616, authorization to fulfill the order may be transmitted 618 to the fulfillment center along with order information, such as item identifiers and the shipping information.

If POS payment is found 608 to have been selected, purchase terms such as a payment deadline, purchase price, and any other relevant terms may be transmitted 620 to the customer. Order information such as a barcode, order identifier, or other information used by the customer when paying at a POS may also be transmitted to the customer. If acknowledgment of payment is found 622 to have been received from the POS before the deadline, then the method proceeds to perform one or more of steps 612-618 for the order. If not, then the order is canceled 624, which may include notifying the customer of cancellation.

Figure 7:
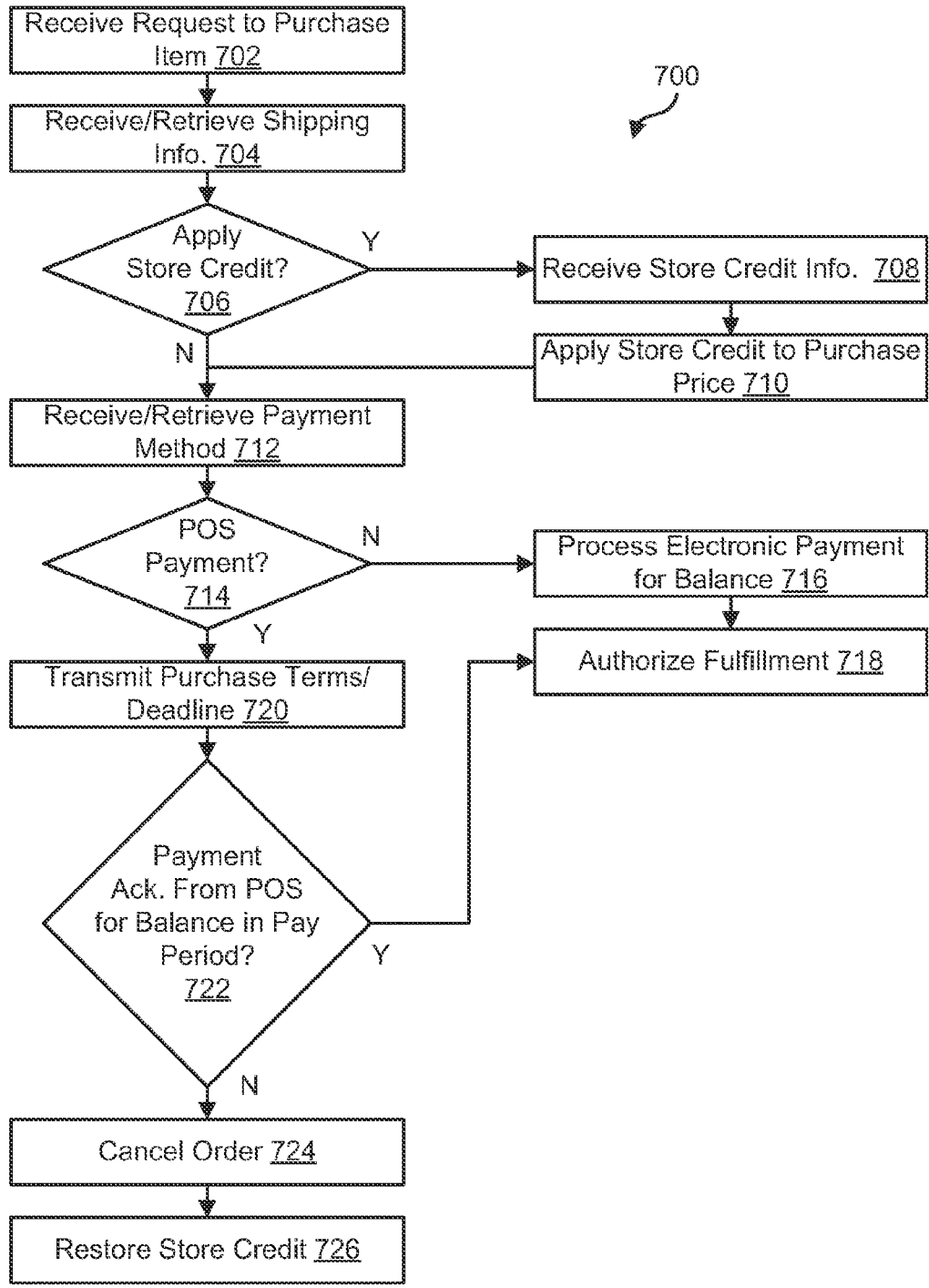
FIG. 7 is a process flow diagram of a method for processing an online transaction including partial payment using store credit in accordance with an embodiment of the present invention.

FIG. 7 illustrates another method 700 for processing an online transaction. The method 700 may be performed along with some or all of the methods described herein. The method 700 may be performed by the merchant system 202a-202b, a POS, some other computing device, or a combination thereof. The method 700 may include receiving 702 a request to purchase one or more items from a customer and receiving 704 from a customer, or retrieving, shipping information.

The method 700 may include evaluating 706 whether the customer has requested to apply store credit. If so, then store credit information may be received 708, such as by receiving a code or other identifier of an account or gift card. Some or all of credit associated with the supplied information may be applied 710 to the purchase price for the order. If the complete purchase price is applied in this manner, no further processing may be performed other than to authorize fulfillment of the order.

A payment method selection may also be received 712 or retrieved for the order. If the method of payment is found 714 to not be a POS payment method, then electronic payment may be processed 716 and fulfillment authorized 718 or otherwise initiated.

If the selected payment method is found 714 to be a POS payment method, then purchase terms, including such information as an order identifier, a payment deadline, purchase price, and/or other relevant information may be transmitted 720 to the customer. If acknowledgment of payment of the balance due is found 722 to have been received from a POS such as an in-store POS, prior to expiration of the pay period, which may include a grace period, then fulfillment of the order is authorized or otherwise initiated.

If acknowledgment of payment of any balance is not found 722 to have been received prior to expiration of the pay period, then the order may be canceled 724 and any store credit applied to the order may be restored 726 to the account or card from which it was drawn. Alternatively, restoration 726 may include mailing a store credit card to the customer or some other means of restoring the store credit to the customer. In some embodiments, restoration may include indicating that a card is available for pick up at a store and authorizing transfer of such a card upon request of the customer and furnishing of authenticating information by the customer. In some embodiments, a customer's choice of one of the aforementioned methods or another refund method for store credit may be received and the refund will be made accordingly.

Figure 8:
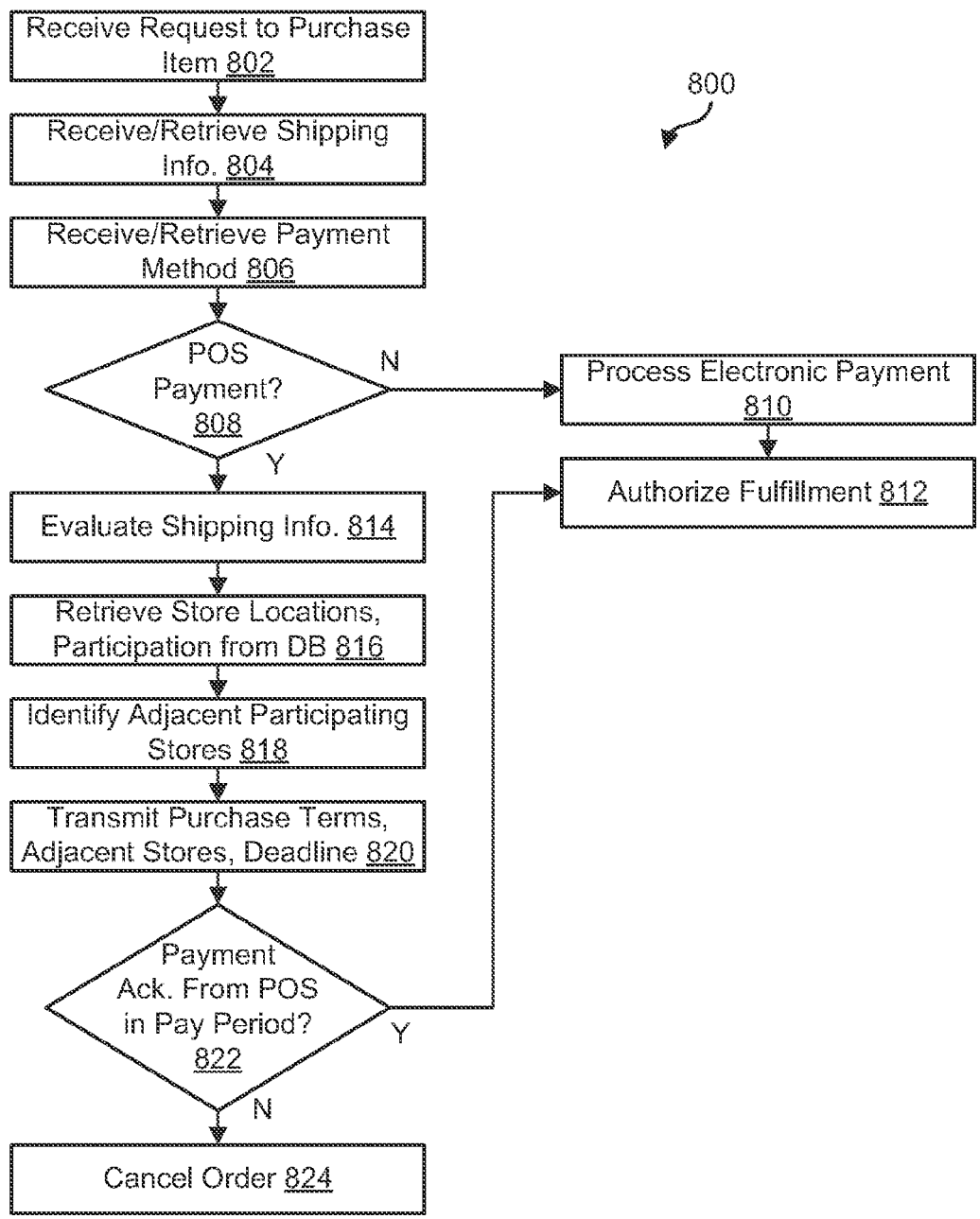
FIG. 8 is a process flow diagram of a method for processing an online transaction including identifying stores eligible for receiving payment in accordance with an embodiment of the present invention.

FIG. 8 illustrates another method 800 for processing an online transaction. The method 800 may be performed along with some or all of the methods described herein. The method 800 may be performed by the merchant system 202a-202b, POS, some other computing device, or a combination thereof.

The method 800 may include receiving 802 a request to purchase one or more items from a customer and receiving 804 from a customer or retrieving shipping information.

A customer's choice of payment method may also be received or retrieved 806. If the chosen payment method is not found 808 to be a POS payment, then electronic payment may be processed 810 as known in the art and fulfillment may be authorized 812 or otherwise initiated.

If POS payment is found 808 to be the chosen method, then the method 800 may include evaluating 814 the shipping information for the order and retrieving 816 from a database store locations and participation status of the stores. Participation status indicates whether the store is capable or otherwise authorized to receive POS payments for online orders. Stores adjacent to the customer (based on the shipping address or other address associated with the customer) and stores that are capable or otherwise authorized to receive POS payments for online transactions may be identified 818. The payment deadline, purchase price, and other information may be transmitted 820 to the customer. The identified adjacent participating stores may also be transmitted 820 to the user to enable the user to locate a store at which to pay for the order.

As with other methods, if acknowledgment of payment of the purchase price is found 822 to have been received from a POS, then fulfillment is authorized 812 or otherwise initiated. If not, the order may be canceled 824.

Figure 9:
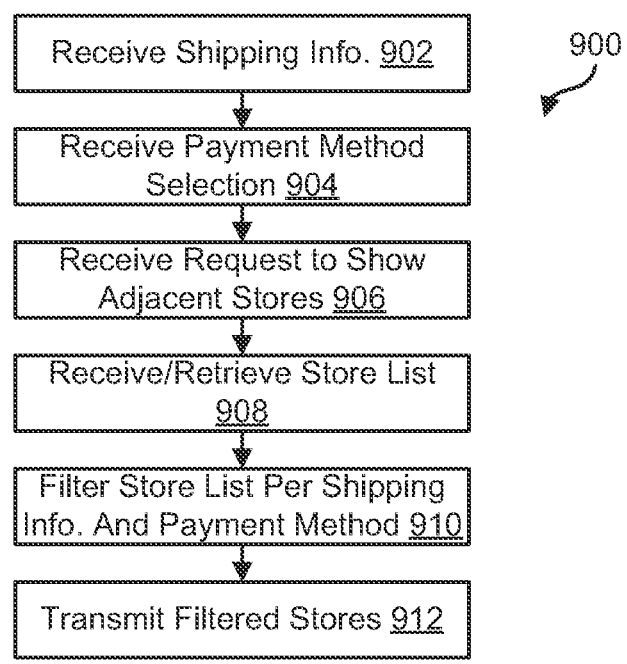
FIG. 9 is a process flow diagram of a method for selecting candidate stores for presentation to a customer in accordance with an embodiment of the present invention.

FIG. 9 illustrates a method 900 for presenting store locations to a customer. While browsing for items a customer may place items in a virtual shopping cart as known in the art. At checkout, a customer may wish to pay at a POS according to the methods described herein. A customer's payment method preference may be input at some point prior to checkout or may be retrieved from records for the customer. In either case, at some point during checkout a user may want to know whether a store is located nearby. This may be due to a desire to use a site-to-store shipping choice, a desire to use a POS payment method, or a desire to locate an item at a nearby store.

In any case, shipping information, or other information indicating a customer's location may be received 902 or otherwise retrieved. A payment method selection may also be received 904 or retrieved. A request to show adjacent stores may also be received 906, for any of the reasons noted above. A list of stores may be retrieved and filtered 910 according to one or both of the shipping (or other geographic) information and the payment method. Filtering according to shipping information may include omitting stores outside a certain proximity to the shipping location. Filtering according to payment method may include omitting stores that do not participate in the selected payment method. A list or map illustrating stores remaining following the filtering operation may be transmitted 912 for display to the customer. Where one or both of shipping information and a payment method selection are not available or have not been made by the customer, the corresponding filtering step may be omitted in some embodiments.

Figure 10:
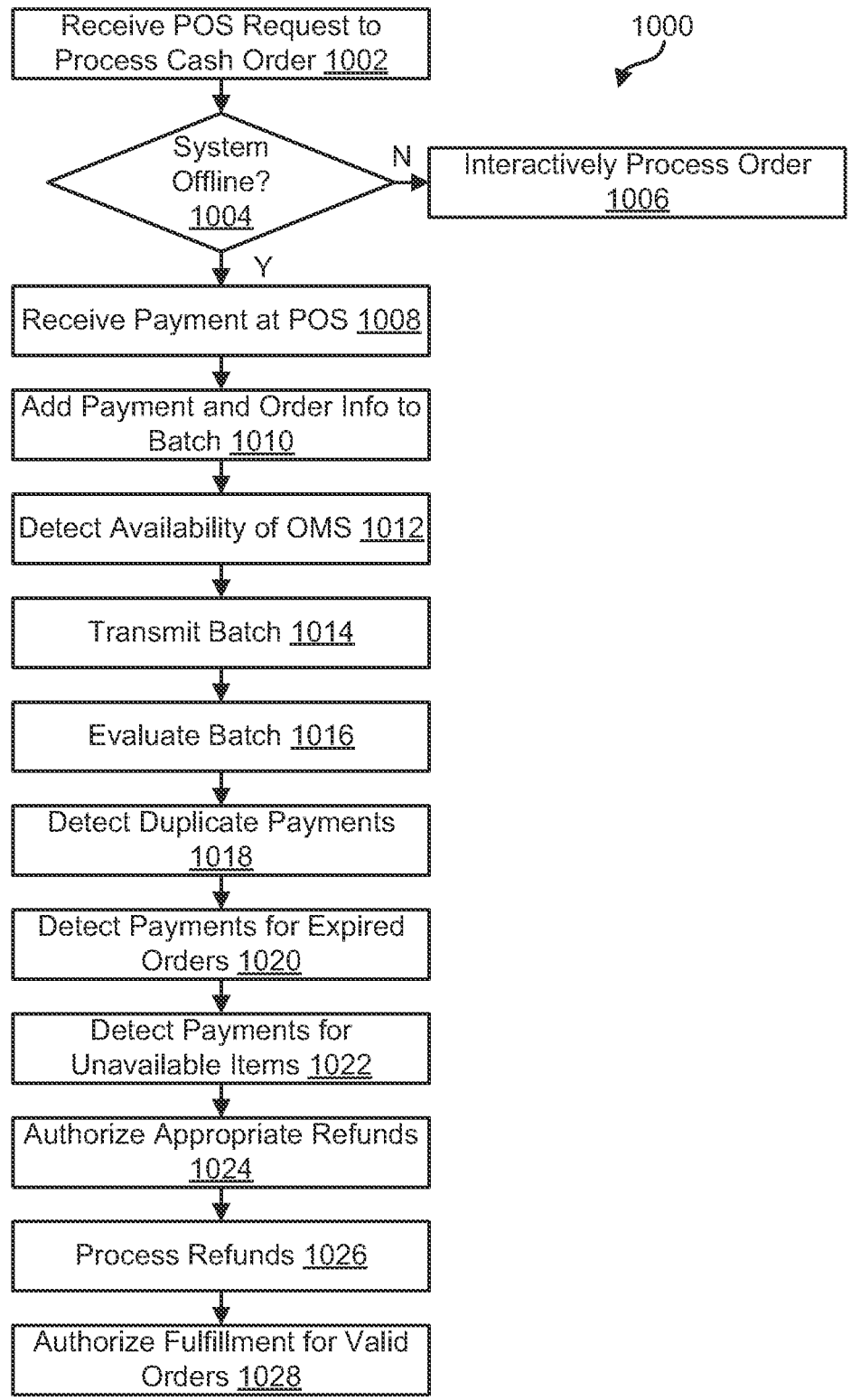
FIG. 10 is a process flow diagram of a method for processing payments at a point of sale (POS) while a merchant system is offline in accordance with an embodiment of the present invention.

FIG. 10 illustrates a method 1000 for processing payments for online transactions at a POS. The method steps of 1000 are attributed to the POS in the discussion below. However, the method steps may be performed by one or both of a POS and a POS host corresponding to the POS.

In particular, the method 1000 is particularly useful in instances where a POS or a POS host is temporarily not able to communicate with a merchant system 202a-202b or some component thereof, such as the order management system 304. The method 1000 may include receiving 1002 a request to process a POS payment for an online payment at a POS. This may be performed by a cashier or a user at a self-checkout POS. The POS may evaluate 1004 whether a merchant system 202a-202b is offline. If not, then the POS may interactively process 1006 the order as in the various methods described herein. This may include the POS transmitting an order identifier to the merchant system 202a-202b, receiving order information from the merchant system 202a-202b, and transmitting acknowledgment of payment to the merchant system 202a-202b after tender of payment is detected or otherwise verified.

If the merchant system is found 1004 to be offline, then a batch processing method according to the following steps may be executed. As noted above, in some methods an order identifier may be used by the POS to request order information from a merchant server 202a-202b. Where the merchant server 202a-202b is not available, a customer printout of the purchase price may be used to provisionally determine the purchase price for the order. Alternatively, a database of pending orders for which POS payment has been selected may be pushed to a POS periodically such that order information can be retrieved without communication with the merchant server.

Tender of payment at the POS may be received 1008. This may include receiving an electronic payment from a credit or debit card, detecting tender of cash to an automated bill and coin collector, receiving an input from a cashier indicating receipt of payment, or some other detection of tender.

The POS may add 1010 order information received from the customer, such as an order identifier, and an amount of tender of payment to a batch file. The batch file may accumulate payment information for tenders of payment for online orders while communication with the merchant server 202a-202b is unavailable.

Once communication with the merchant server 202a-202b is restored, the POS may reconcile the batch of received payments with the merchant server. Accordingly, the method 1000 may include detecting 1012 availability of the merchant system 202a-202b. This may be accomplished by the merchant server 202a-202b contacting to the POS upon restoration of communication. Alternatively, the POS that has a batch file with unreconciled payments in a batch file may periodically query the merchant server to determine if the merchant server 202a-202b is online until a response is detected 1012.

The POS may transmit 1014 the batch file to the merchant system 202a-202b for processing by the merchant system 202a-202b. The merchant system 202a may then evaluate the batch 1016 relative to pending orders having POS payment as the payment method.

The method 1000 may include detecting 1018 duplicate payments. Inasmuch as communication with the merchant system 202a-202b was not \possible at the time of payment, it is possible that multiple payments could have been received since the POS was unable to determine whether an order has already been paid. Accordingly, multiple payments associated with the same order identifier may be detected 1018.

Payments recorded in the batch file may also be evaluated with respect to order records to determine 1020 whether order payments have been received for expired orders. Payments recorded in the batch file may also be evaluated with respect to order records to detect 1022 payments for unavailable items.

If for any reason an order cannot be fulfilled due to one or more of expiry and unavailability of the item(s) of the order, then appropriate refunds may be authorized 1024 and processed 1026. If an order can be fulfilled, then fulfillment of the order may be authorized 1028 or otherwise initiated. If an order for which payment is noted in the batch file as expired and fulfillment of the order is still possible (e.g., inventory is available or otherwise sufficiently abundant) in some embodiments, fulfillment of the order may be authorized 1028 notwithstanding expiry.

Refunds may also be authorized 1024 corresponding to a price reduction for one or more items in an order, where the price reduction occurred between the time an order is created and payment was received at the POS, as described herein below with respect to FIGS. 18-20. In some embodiments, refunds may also be authorized corresponding to a price reduction that occurred between the time an order is created and the time the batch is received by the merchant system 202a-202b.

Figure 11:
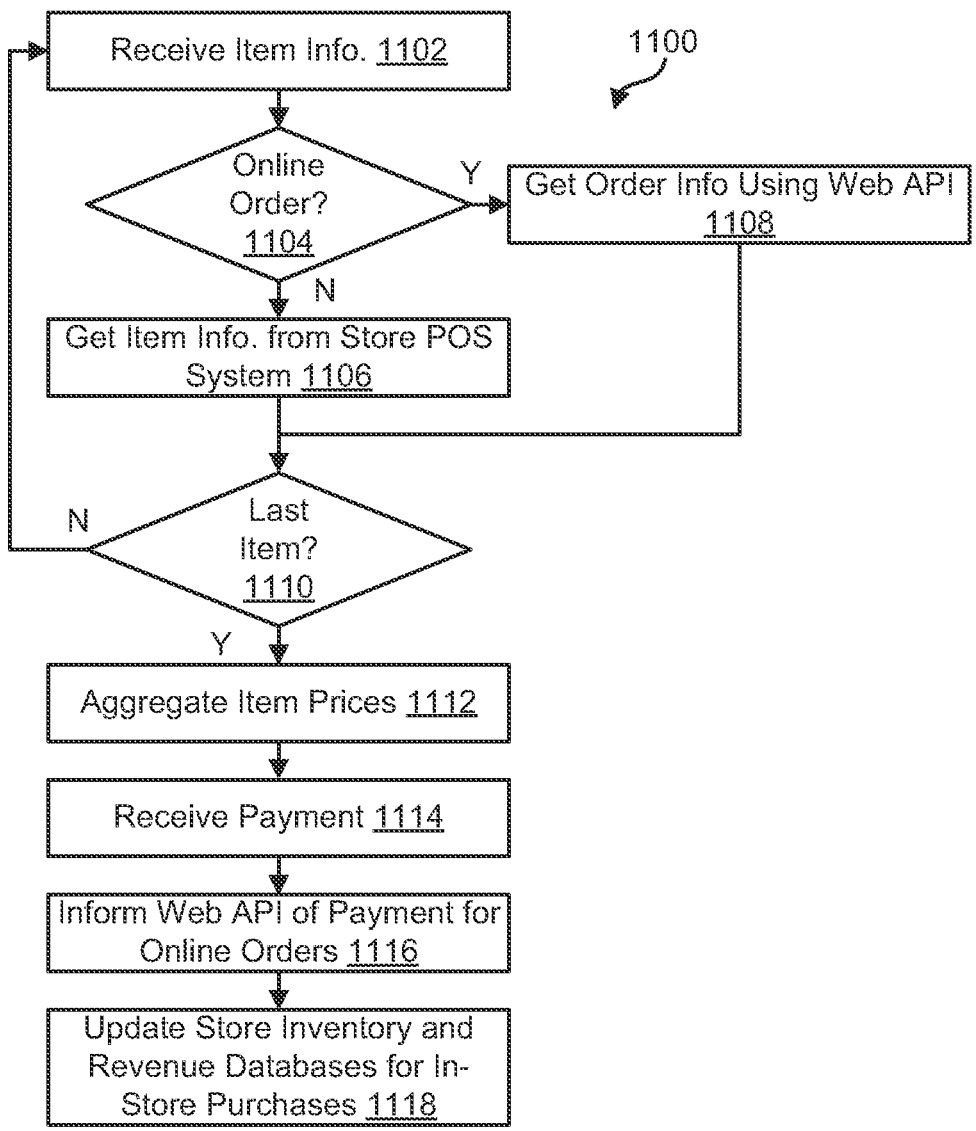
FIG. 11 is a process flow diagram of a method for processing transactions including payment for in-store and online purchases.

FIG. 11 illustrates a method 1100 for processing mixed purchases of online orders and in-store selections. The method steps described below are attributed to a POS. However, the method steps may also be performed using a POS, POS host, a merchant system 202a-202b, or a combination of these. A POS receives item information 1102. This may include scanning a barcode affixed to the item or printed out by the customer for an online order. For online orders, a customer's order may also be retrieved from a merchant system 202a-202b by other means, such as using the customer's name, phone number, or other identifying information. If the item is found 1104 to be an online order, then the order information may be retrieved 1108 such as using a web application programming interface (API) or other means, to retrieve order information such as one or more of a purchase price, item identifier(s), and an identity of an authorized pick up person. If the item is not found 1104 to be an online order, then item information may be retrieved 1106 by the POS from a POS host or other system for managing a store inventory and checkout process. The item information retrieved may include one or more of an item identifier and a purchase price.

Item information may be received 1102 and evaluated 1104 until information for the last item of the customer's purchase is found 1110 to be received. An aggregate price for all in-store selections and online orders may then be aggregated 1112. This may include calculating any tax due and applying any discounts or coupons the customer has used. Tender of payment is received 1114 by the POS by detecting payment by cash or check or by processing electronic payment such as a store credit card or a debit or credit card. The POS then informs 1116 the merchant system 202a-202b of payment for any online orders in the purchase, such as by means of a web API provided by the merchant system 202a-202b. Likewise, inventory and accounts associated with the store may be updated 1118 to reflect purchases of in-store items. This may be accomplished by notifying a POS host of details of the transaction.

Figure 12:
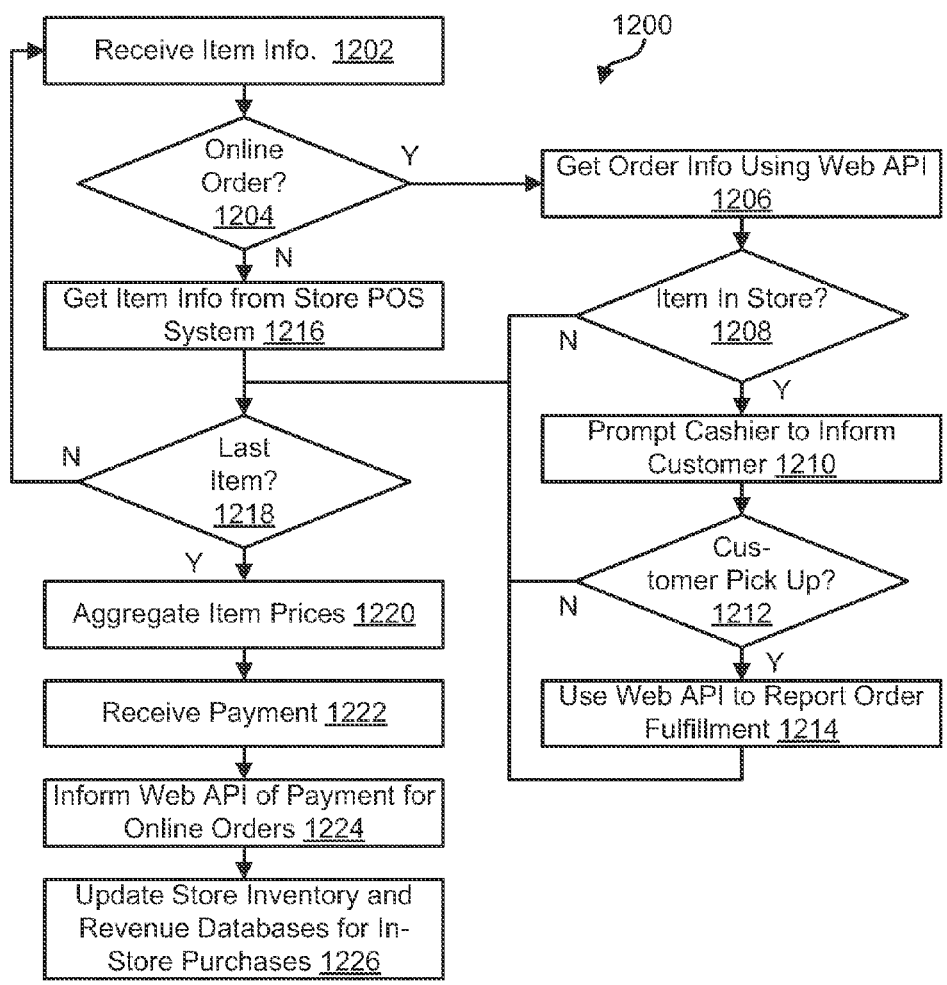
FIG. 12 is a process flow diagram of an alternative method for processing transactions including payment for in-store and online purchases.

FIG. 12 illustrates another method 1200 for processing mixed purchases of online and in-store items. As in the method 1100, the steps described in the method 1200 as being performed by a POS may also be performed by one or more of a POS, POS host, and merchant system 202a-202b. As for the method 1100, item information may be received 1102, such as by scanning a barcode affixed to a product or by having the customer print out the information for an online order. Item information may also be received for an online order by looking up a customer's order based on the customer's name or other identifying information.

If the order is found 1204 to be an online order then order information may be retrieved 1206 from the merchant system 202a-202b, such as by using a web API. The order information retrieved may include one or more item identifiers and a purchase price. If an item corresponding to the online order is found 1208 to be available in the store, a prompt may be displayed 1210 to a cashier or customer to inform the customer that the item is available in-store. If the POS finds 1212 that the customer has chosen to pick up an item from the store, then the POS may inform the merchant system 202a-202b of fulfillment of the order upon payment, such as by means of a web API. The POS may detect a user choice to pick up an item from an online order by detecting scanning of a barcode for the item, or by a cashier or customer providing an input which will indicate pick up of the item(s) for the online order.

As for the method 1100, if the item is found 1204 to be an in-store purchase, item information is retrieved 1216 from a store system, such as a POS host. When the last item is found 1218 to have been received, an aggregate price is calculated 1220, which may include calculating any tax and applying any applicable coupons or discounts. Tender of payment is detected 1222 by the POS, and the POS informs the merchant system 202a-202b, such as by means of a web API, of payment for any online orders. Likewise, store inventory and accounts are updated to reflect purchases of in-store items, including items from online orders that the customer chose to pick up. This may include notifying a POS host of in-store purchases and tender of payment.

Figure 13:
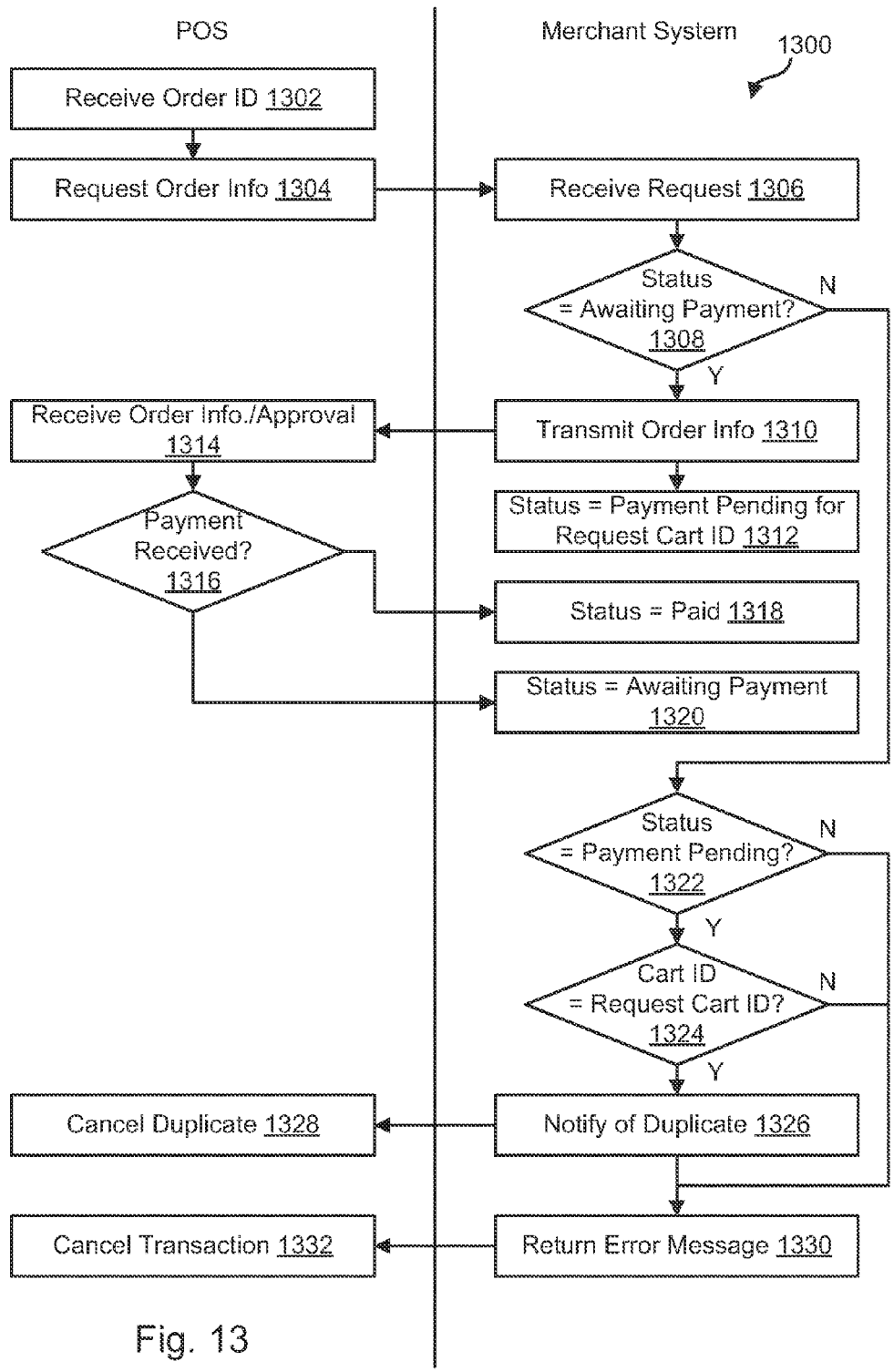
FIG. 13 is a process flow diagram of a method for processing payment for online orders at a POS in order to prevent duplicate payments in accordance with an embodiment of the present invention.

FIG. 13 illustrates a method 1300 for avoiding receiving duplicate payments for online orders at a POS. An order identifier may be received 1302 at a POS according to any of the ways described in previous methods. The POS then requests order information 1304 for the order identifier, such as one or more of a purchase price, order status, item identifier, or other information. The merchant system 202a-202b receives 1306 the request and evaluates 1308 the status of the order associated with the order identifier. If the status is found 1308 to indicate the order is "awaiting payment," then the requested order information may be transmitted 1310 to the POS and the status for the order may be changed 1312 to indicate "payment pending." An identifier of the POS that submitted the request, or "cart ID" may also be associated with the order.

Upon receiving 1314 the order information, the POS may receive payment. If payment is found 1316 to have been received prior to closing of the POS transaction, then the merchant system 202a-202b may be notified and the status of the order is changed 1318 to indicate that payment has been made. If payment is not found 1316 to have been received prior to closing the transaction, the POS may notify the merchant system 202a-202b, which may then change 1320 the status of the order to indicate that it is awaiting payment.

If the status of the order is not found 1308 to indicate awaiting payment, then the method may include evaluating 1322 whether the order status indicates payment pending. If so, then the "cart ID" associated with the order may be evaluated 1324. If it is the same as the "cart ID" received from the POS in the current iteration of the method 1300, this indicates that multiple requests were received from the same POS during the same transaction. The POS may therefore be notified 1326 of the duplicate and the POS may then cancel 1328 the duplicate request for order information.

In case the status is not found 1322 to indicate payment pending or the "cart ID" for order is not found 1324 to match the "cart ID" for the current request being processed in the current iteration of the method 1300, an error message may be returned 1330 to the POS and the POS may then cancel the request for order information and may not proceed with receiving payment for the online order.

A log of requests may be kept for troubleshooting purposes. In some embodiments, the case where an order status is not being paid, awaiting payment, or payment pending may be impossible to reach, as these particular order statuses do not need to be dealt with. In other embodiments, the status may revert to awaiting payment within a time period after this status is reached. Alternatively, an alert may be transmitted to an employee, who may then manually reset the status after viewing a log of activity for the order. In some embodiments, each request for information for an order or to update the status of an order received from a POS may be logged in a record associated with the order to enable resolution of error conditions.

Another potential error condition is where a POS for some reason causes the status to change to "payment pending" and then hangs or loses communication with the merchant system 202a-202b before notification of payment or cancellation without payment can be transmitted to the merchant system 202a-202b. In such instances, the status may revert to "awaiting payment" after a timeout period. Alternatively, the order may remain in this state until a customer service representative or other employee reviews the transaction history and reverts the status to awaiting payment or paid, based on the present circumstances.

Figure 14:
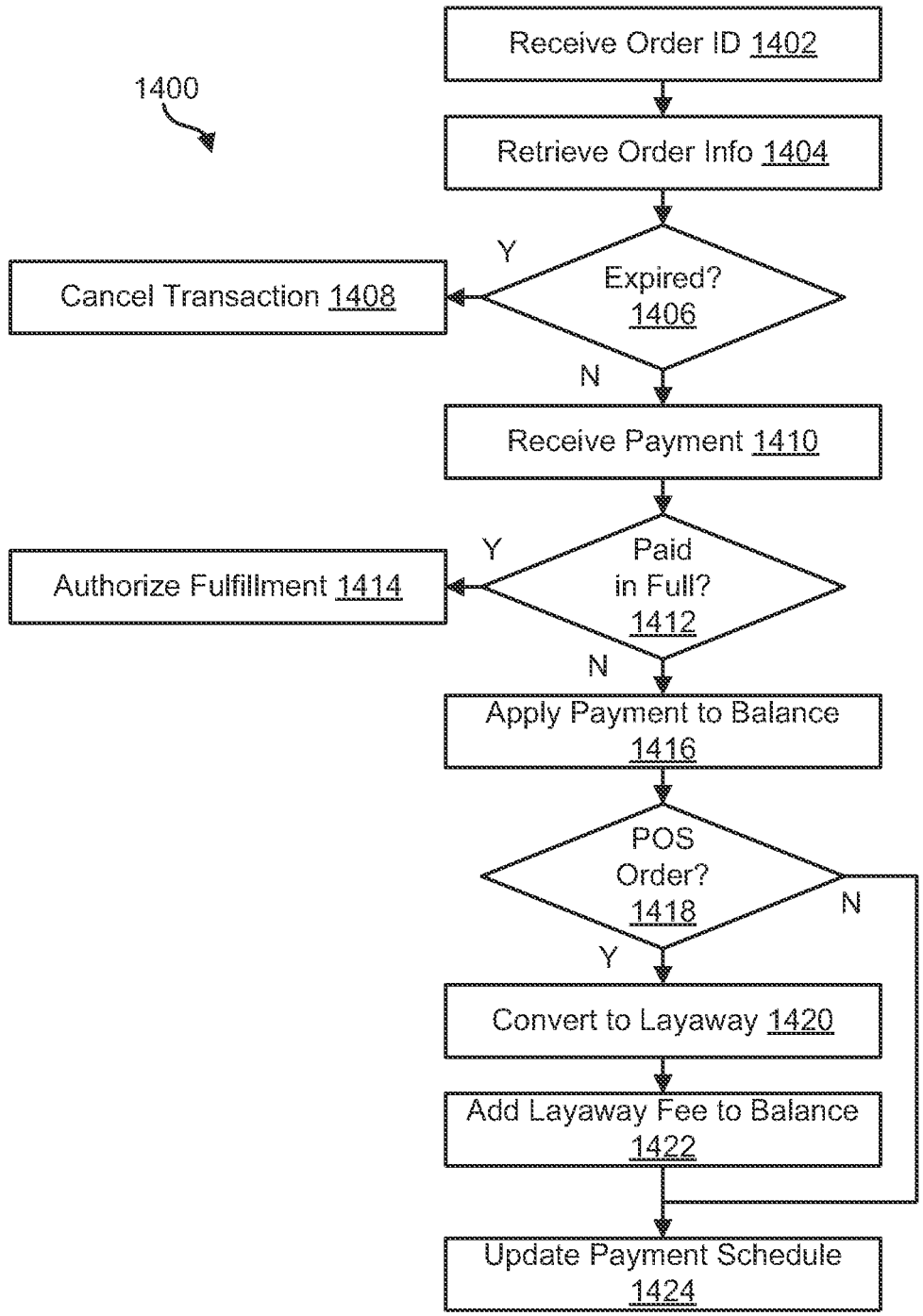
FIG. 14 is a process flow diagram of a method for processing payments for layaway and online orders in accordance with an embodiment of the present invention.

FIG. 14 illustrates a method 1400 for processing payments for layaway items as well as online orders for which POS payment was selected. In some embodiments, upon placing an order, a user may specify a form of electronic payment, POS payment, or layaway. For layaway, a customer may be charged a fee and be permitted to pay for an item in installments. In some embodiments, these installments may be made electronically online or at a POS. In either case, an order is created, but adding the order to a queue for assignment to a fulfillment center is delayed until complete payment is received.

The steps of the method 1400 may be distributed among some or all of a POS, POS host, and a merchant system 202a-202b. An order ID may be received 1402, such as by inputting the order ID to a POS according to any of the methods described hereinabove. Receiving 1402 the order ID may include receiving the order ID by a merchant system 202a-202b from a POS. Order information corresponding to the order ID may be retrieved 1404, which may include transmitting the order information to a POS. If the order is found 1406 to be expired, the transaction may be canceled 1408. This may include notifying the POS of expiration by the merchant system 202a-202b, and canceling or otherwise voiding the transaction initiated at the POS with respect to the online order.

If the order is not found 1406 to be expired, then payment may be received 1410. This may include receiving tender of payment at the POS in one of multiple forms already mentioned herein and transmitting notice of payment from the POS to the merchant system 202a-202b.

If the order is found 1412 to be paid in full as a result of the payment, then fulfillment of the order may be authorized 1414 or otherwise initiated. If the order is not found 1412 to be paid in full, i.e., the payment is a partial payment, then the payment may be applied 1416 to the balance due for the order.

In some embodiments, partial payments will not be accepted by the POS for a non-layaway order (e.g., a pay at POS order). However, in some embodiments, partial payments for non-layaway orders may be received by the POS. In one embodiment, if a partial payment is found 1418 to have been received for a POS payment order that is not layaway, the order is converted 1420 to a layaway order. A layaway fee, accompanied by customer notification, may be added 1422 to the balance due for the order in embodiments such that a fee is ordinarily applied to layaway orders.

In the cases of both partial payment for layaway and non-layaway orders, a payment schedule may be updated 1424 according to the partial payment. For example, if the customer pays more than a single installment for a layaway order, the amount and timing of further payments may be adjusted. For a non-layaway order, a payment schedule taking into account the partial payment may be generated and transmitted or otherwise communicated to the customer.

In an alternative embodiment, if a partial payment is received for a non-layaway order for which the POS payment method has been selected during the expiry period, the order is not converted to a layaway order. In some embodiments, if full payment is not received by the end of the expiry period, the order is then converted to a layaway order and a payment schedule may be generated. In addition, fees may be assessed and customers may be notified. In other embodiments, the order is simply canceled and a refund of the partial payment is initiated. In some embodiments, a user may specify at the time of placing the order which of the foregoing methods will be used in response to a partial payment.

Figure 15:
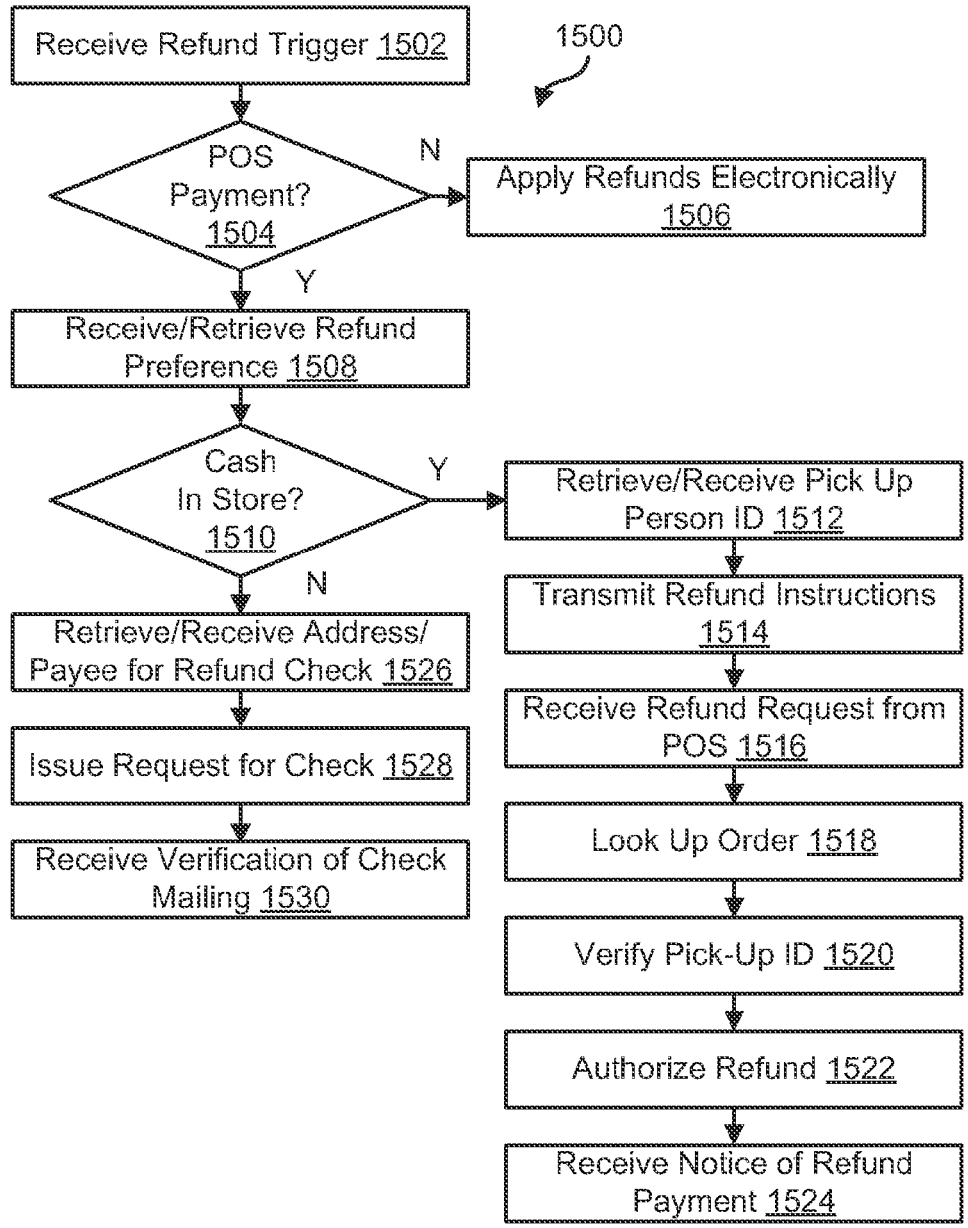
FIG. 15 is a process flow diagram of a method for processing refunds in accordance with an embodiment of the present invention.

FIG. 15 illustrates a method 1500 for processing refunds for online orders for which a POS payment method has been selected and processed according to any of the methods described hereinabove. The method 1500 may include receiving 1502 a refund trigger. Various triggers may be received. Examples of triggers include detecting unavailability of an item after a customer has paid for the item at a POS but prior to shipment, receiving a customer request to cancel an order after payment, and failure of a customer to provide full payment after making a partial payment by means of a store credit card or a partial payment at a POS. Other refund triggers include, but are not limited to, detecting an overpayment, and detecting that payment has already been received.

In instances where a product has been shipped to a customer, a refund may be triggered following both the receipt of a request for a refund and the receipt of the returned product from the customer. As known in the art, packaging, labeling, and prepaid shipping labels may be mailed to the customer in response to a request for a refund. A refund may then be triggered when an input is received indicating that the returned product has been received by the merchant.

Following receipt of a refund trigger, the method 1500 may include evaluating 1504 whether the order for which a refund has been triggered was paid for at a POS. If not, an electronic refund may be applied 1506 electronically, such as by electronically crediting the credit or debit card used to pay for the purchase.

If the order was paid for at a POS, then a refund preference may be received or retrieved 1508. In some instances, a customer may specify a refund preference in the customer's account or at the time of order placement. In other instances, a refund preference may be specified at the time a refund is requested. In some embodiments, a customer may be prompted to specify a refund preference and the customer preference may be received after a refund trigger is received 1502.

In some embodiments, where no refund preference has been specified, the refund may be processed by initiating mailing of a check to a known address for the customer. For example, if a refund preference has not been specified or otherwise received 1508 within a configurable number of hours after the refund trigger has been received 1502, the refund may be processed as if the customer requested mailing of a check.

If the customer preference is found 1510 to indicate payment at a POS, an identifier for a pick-up person may be received or retrieved 1512. As for the refund preference, the pick-up person ID may be stored in the customer's account, specified at the time the order is placed, or received in response to prompting at the time of the refund trigger or after the refund trigger. Refund instructions may also be transmitted 1514 to the customer. The refund instructions may include barcode and/or order identifier. The refund instructions may also identify the authorized pick-up person. In some embodiments, the refund instructions may indicate the location of one or more stores at which a refund may be received, such as described in FIG. 8 or 9.

A customer may then go to a store and present at the POS the barcode, order identification number, or some other information to identify the customer or order. The barcode may be scanned or any other information may be received by the POS and transmitted to the merchant system 202a-202b. The merchant system 202a-202b may receive 1516 the information and use it to look up 1518 the order. This may include transmitting data obtained from the barcode or otherwise received to the merchant system 202a-202b, which then locates the corresponding order information and returns it to the POS. The order information transmitted to the POS may include an identity for a pick-up person and a refund amount.

The identity of the person attempting to obtain the refund may then be verified 1520. This may include receiving an input from a cashier at a POS affirming the identity of the pick-up person following inspection of photo ID provided by the person. Verification of the identity may also include receiving a personal identification number (PIN) or password assigned to or chosen by a customer for purposes of verification. If the identity of the pick-up person corresponds to the authorized pick-up person designated by the customer, then refund is authorized 1522. The POS may then output money or instruct a cashier to refund the money. Upon detection of tender of the refund, the POS may transmit notice of the refund to the merchant system 202a-202b, which receives 1524 the notice and records the fact that a refund was given, such as in the order record for the order.

If a "cash in store" refund is not found 1510 to have been requested, then a name and/or address for a payee may be received or retrieved 1526 for the order. As for other refund preferences, the payee name and address may be stored in the customer's account, specified at the time the order is placed, or received in response to prompting at the time of the refund trigger or after the refund trigger. In some embodiments, the payee may be constrained to be identical to the customer who placed the order or the person who paid for the order at a POS.

A request for a check 1528 may be transmitted to an entity authorized and capable of issuing checks such as a payment processing system 316 as described above, a financial institution, or other entity. The entity to which the request was made may transmit verification that a check was mailed and this verification may be received 1530 by the order management system, which notes this fact such as in the order record for the order.

Figure 16:
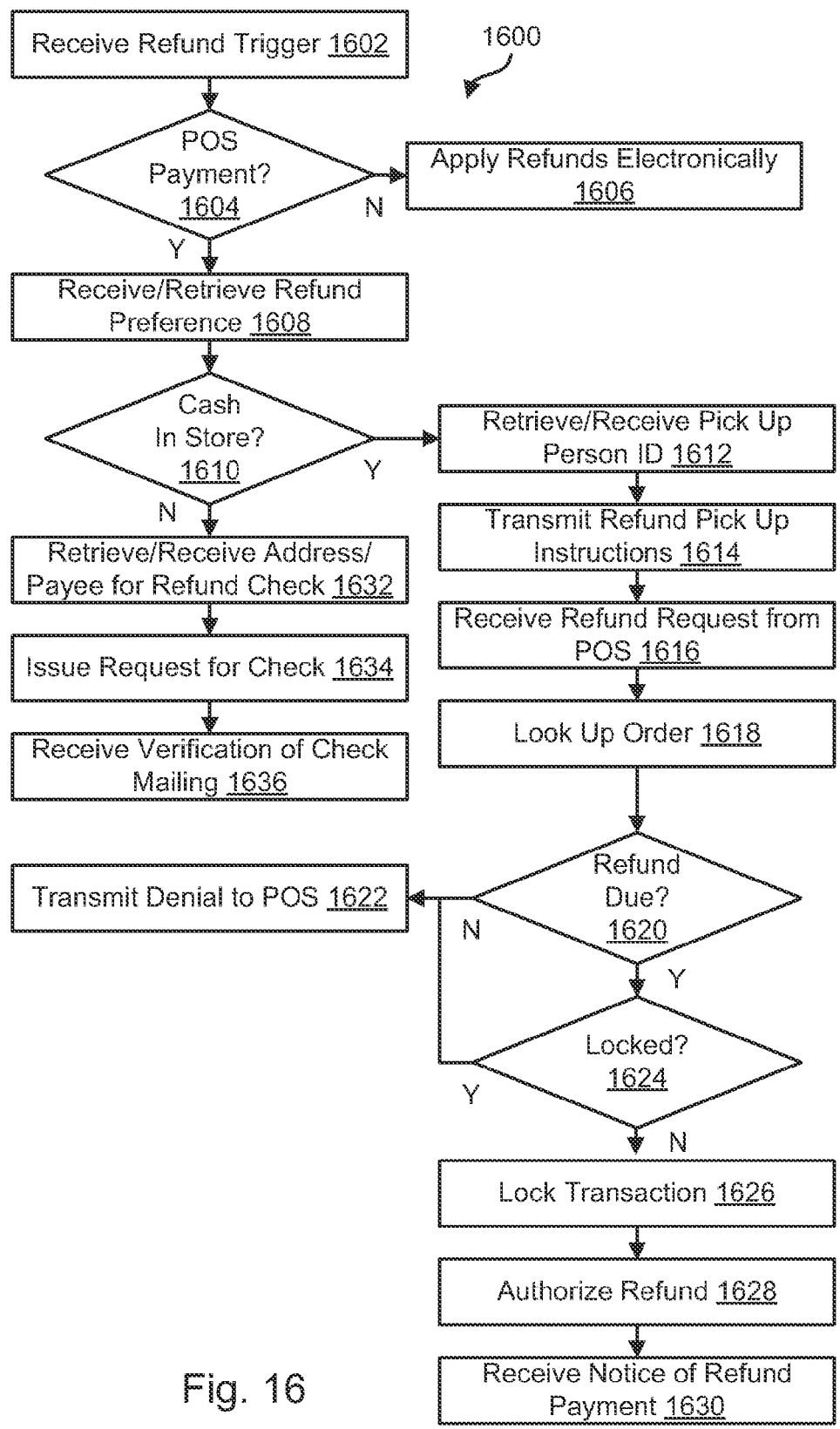
FIG. 16 is a process flow diagram of another method for processing refunds in accordance with an embodiment of the present invention.

FIG. 16 illustrates another method 1600 for processing refunds for orders for which a POS payment method has been selected and processed according to any of the methods described hereinabove. The method 1600 may include receiving 1602 a refund trigger. Various triggers may be received. Examples of triggers include detecting unavailability of an item after a customer has paid for the item at a POS but prior to shipment, receiving a customer request to cancel an order after payment, and failure of a customer to provide full payment after making a partial payment by means of a store credit card or a partial payment at a POS.

In instances where a product has been shipped to a customer, a refund may be triggered following the receipt of a request for a refund and the receipt of the returned product from the customer. As known in the art, packaging, labeling, and prepaid shipping labels may be mailed to the customer in response to a request for a refund. A refund may then be triggered after the returned product is received.

Following receipt of a refund trigger, the method 1600 may include evaluating 1604 whether the order for which a refund has been triggered was paid for at a POS. If not, an electronic refund may be applied 1606 electronically, such as by electronically crediting a credit or debit card.

If the order was paid for at a POS, then a refund preference may be received or retrieved 1608. In some instances, a customer may specify a refund preference in the customer account or at the time of order placement. In other instances, a refund preference may be specified at the time a refund is requested. In some embodiments, a customer may be prompted to specify a refund preference and the customer preference may be received after a refund trigger is received 1602.

If the customer preference is found 1610 to indicate payment at a POS, an identifier for a pick-up person may be received or retrieved 1612. As with the refund preference, the pick-up person ID may be stored in the customer's account, specified at the time the order is placed, or received in response to prompting at the time of the refund trigger or after the refund trigger. Refund instructions may also be transmitted 1614 to the customer. The refund instructions may include barcode and/or order identifier. The refund instructions may also identify the authorized pick-up person. In some embodiments, the refund instructions may indicate the location of one or more stores at which a refund may be received.

A customer may then go to a store and present at the POS the barcode, order identification number, or some other information to identify the customer or order. The barcode may be scanned or any other information may be received 1616 from the POS by the merchant system 202a-202b and used to look up 1618 the order. This may include transmitting data obtained from the barcode or otherwise received by the merchant system 202a-202b, which then locates the corresponding order information and returns it to the POS.

The method 1600 may include evaluating 1620 whether a refund is due. This may include evaluating an order record associated with the order by the merchant system 202a-202b to determine whether a refund has previously been issued or whether any payment has actually been made on the order. If a refund is not found 1620 to be due, then a denial of the refund may be transmitted 1622 to the POS or otherwise transmitted to the customer.

If a refund is due, the method 1600 may include evaluating 1624 whether the order is locked. A locked order may indicate that a refund is in process at another POS. If the order is found 1624 to be locked, then step 1622 may be performed. Otherwise, the transaction is locked 1626. Locking may include setting a flag in an order record indicating that it is locked. A refund may be authorized 1628. This may include communicating authorization to the POS. A cash refund, or other type of refund, may then be issued to the customer either automatically or by the cashier. The cashier may input to the POS an indication that a refund has been given. The POS may transmit notice of the refund to the merchant system 202a-202b. The merchant system then receives 1630 the notice of refund and may record this fact, such as in the order record associated with the order.

In some embodiments, if a refund is not actually issued after an order is locked 1626, the lock may be released without indicating that a refund was given. In some embodiments, the POS may provide notice to the merchant system that the transaction was canceled without an actual refund given. Upon receiving such a notification, the merchant system 202a-202b may release the lock. In some embodiments, if a notice of refund is not received in some interval, such as a number of hours, then the lock may be released. Other criteria may also be used to release the lock if notice of refund is not received.

If a "cash in store" refund is not found 1610 to have been requested, then a name and/or address for a payee may be received or retrieved 1632 for the order. As for other refund preferences, the payee name and address may be stored in the customer's account, specified at the time the order is placed, or received in response to prompting at the time of the refund trigger or after the refund trigger. In some embodiments, the payee may be constrained to be identical to the customer who placed the order or the person who paid for the order at a POS. A request for a check 1634 may be transmitted to an entity authorized and capable of issuing checks such as a payment processing system 316 as described above, a financial institution, or other entity. The entity to which the request was made may transmit verification that a check was mailed and this verification may be received 1636 by the order management system, which notes this fact such as in the order record for the order.

Figure 17:
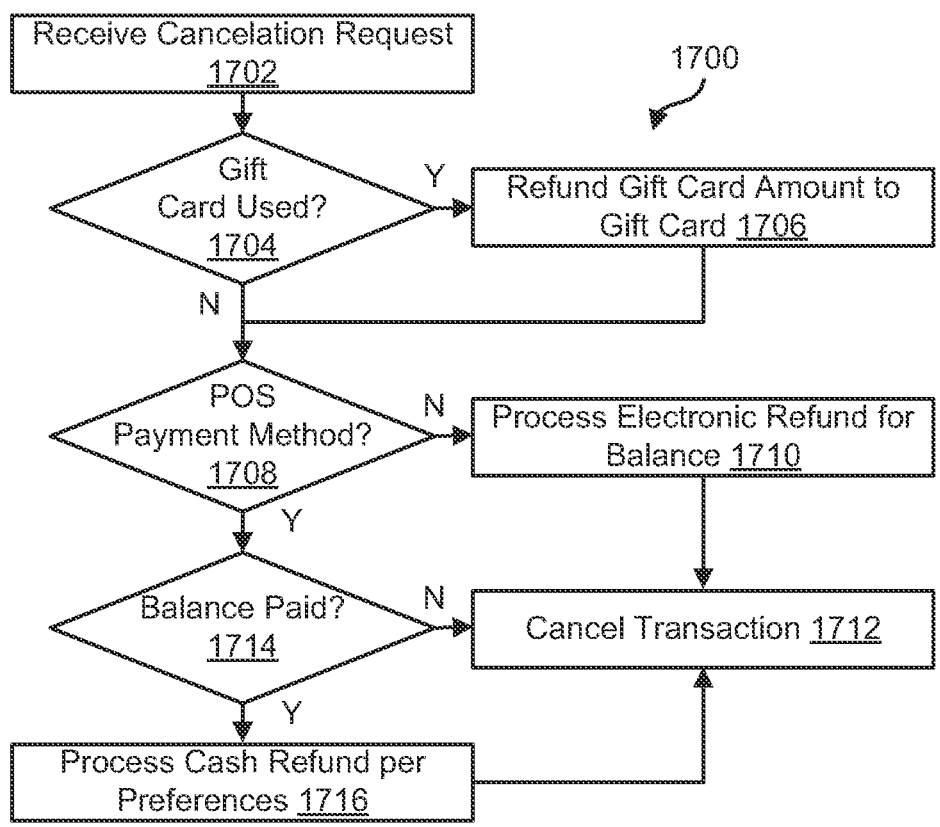
FIG. 17 is a process flow diagram of another method for processing refunds in accordance with an embodiment of the present invention.

FIG. 17 illustrates a method 1700 for processing a refund for an order in which all or part of the purchase price for an online transaction is paid using a store credit card such as a gift card. The method 1700 may include receiving 1702 a cancellation request. The cancellation request may include any of the refund triggers listed above with respect to FIGS. 16 and 17.

The method 1700 may include evaluating 1704 whether store credit, such as a store credit card or gift card, was used to pay for all or part of the purchase price for the order. If so, then the portion of the purchase price paid with store credit may be refunded 1706 to the store credit account from which it was originally drawn, or otherwise restored in the form of store credit. Notice of this refund and of the amount of store credit may also be transmitted to the customer.

Regardless of whether store credit was used, the method 1700 may include evaluating 1708 whether a POS payment method was used to pay for the order, such as the POS payment methods described herein. This may include evaluating the order record associated with the cancellation request. If a POS payment method was not used, then electronic refund may be processed 1710 as known in the art for the balance due on the order after any amount paid in store credit has been refunded 1706. The transaction may also be canceled 1712 such that the order will not be fulfilled, if it has not yet been fulfilled.

If a POS payment method is found 1708 to have been used, then the method 1700 may include evaluating 1714 whether the balance of the purchase price was actually paid at a POS. This may include evaluating whether acknowledgment or notice of payment has been received from a POS, as recorded in an order record associated with the order. If not, then the order may be canceled 1712, which may include noting cancellation in the order record for the order. If some or all of the balance has been paid then a refund may be processed 1716. This may include processing 1716 the refund according to methods described in one or both of FIGS. 15 and 16.

Figure 18:
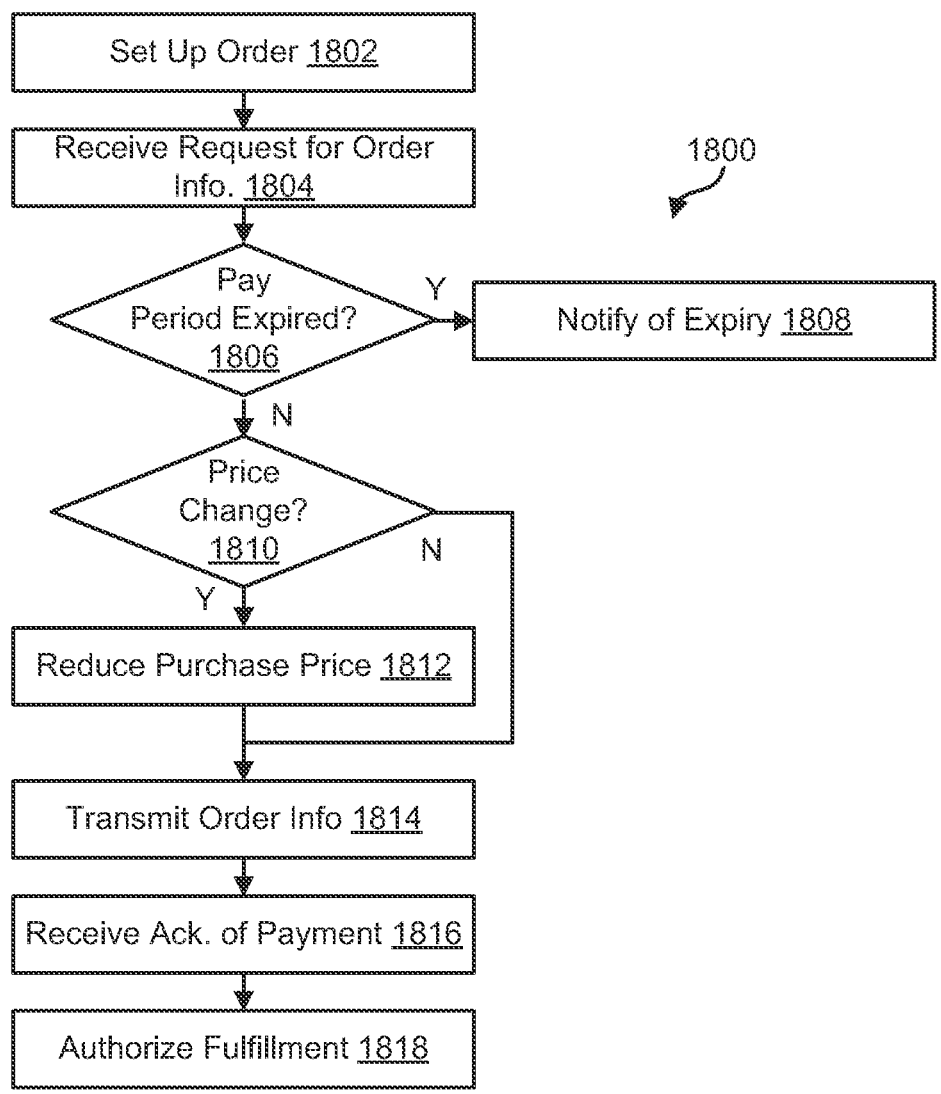
FIG. 18 is a process flow diagram of a method for processing reduction in price for items for which payment at a POS is the selected payment method in accordance with an embodiment of the present invention.

FIG. 18 illustrates a method 1800 for responding to price changes for items associated with online orders for which a POS payment method is selected. The method 1800 may be executed by one or more of the merchant system 202a-202b, POS, and POS host. The method 1800 may include setting up 1802 an online order with POS payment as the selected payment method, such as according to the methods described herein. Setting up 1802 an order may include executing some or all of the steps of the foregoing methods. For example, an order may be set up by receiving at least one item selection, receiving or retrieving a payment method selection, and receiving or retrieving shipping information. As already noted, the method 1800 is useful for online orders for which payment at a POS is the selected payment method.

The method may include receiving 1804 a request for order information from a POS. As noted above, a request for order information may include an order identifier and may be generated by the POS in response to input of the order identifier at the POS when the customers attempts to tender payment at a POS in a store. An order corresponding to the order identifier may be evaluated 1806 to determine if the order has expired because the deadline for providing payment has passed. If so, then the POS and/or customer may be notified 1808 of expiry. If not, then the method 1800 may include evaluating 1810 whether a price change for any items associated with the order has occurred since the order was set up 1802. If so, then the purchase price for the order may be reduced 1812 to the current price. In either case, the order information with the current price may be transmitted 1814 to the POS. Upon receiving 1816 acknowledgment of payment of the purchase price, fulfillment of the order may be authorized 1818 or otherwise initiated.

Figure 19:
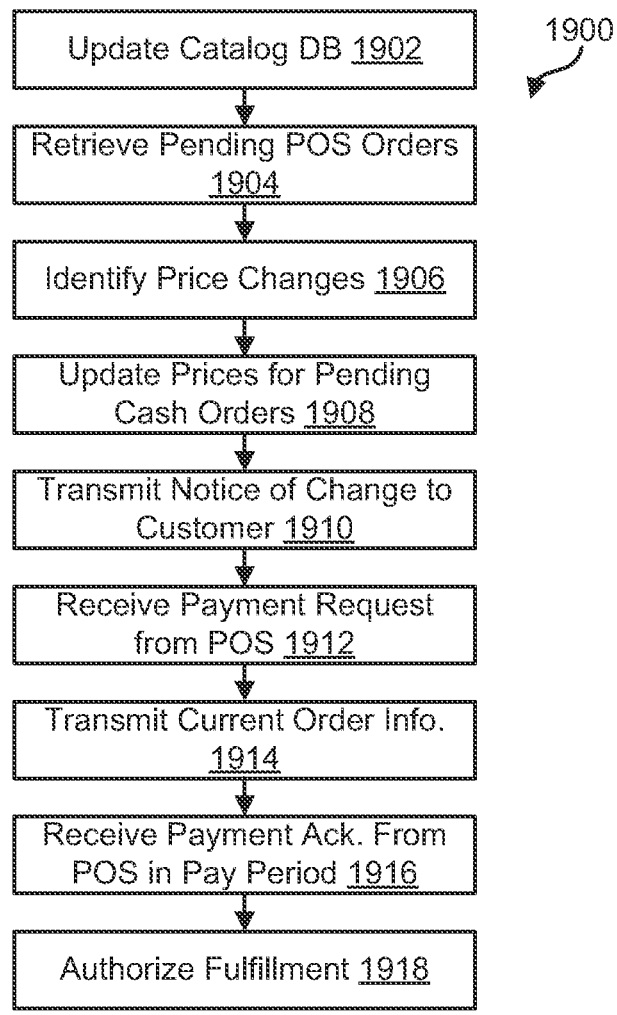
FIG. 19 is a process flow diagram of another method for processing reductions in price in accordance with an embodiment of the present invention.

FIG. 19 illustrates another method 1900 for adjusting the price for an order in which the POS payment method described herein has been selected by a customer. The method 1900 may be performed by one or more of a merchant system 202a-202b, POS, POS host, or other component. The method 1900 may include updating 1902 a catalog of items offered for sale by means of a web site. This may include any type of update operation such as adding items, changing item descriptions, or the like. In particular, updating 1902 may include updating the price for items in a catalog. Both price increases and decreases may be performed.

The remaining steps of the method 1900 may be performed after each catalog update, or each catalog update in which a price decrease occurs. In some embodiments, some or all of the remaining steps of the method 1900 may be performed as part of the catalog update process 1902, such as by the same script or software module. In some embodiments, some or all of the remaining steps of the method 1900 may be performed prior to changes to the catalog becoming effective.

The method 1900 may include retrieving 1904 or otherwise receiving 1904 pending online orders for which POS payment is the selected payment method. The orders retrieved 1904 may include orders with POS payment for which the order has been created but acknowledgment of payment has not yet been received from the POS.

Price changes between the purchase price of items as recorded in an order and the updated prices of the catalog may be identified 1906 and the purchase price for these items in the pending orders may be updated 1908 to reflect the current price. In some embodiments, all changes to the purchase price for items in an order may be recorded in a price change history for the order. This recording may be used to prevent duplicate price reductions. Notice of changes in price to pending orders may be transmitted 1910 to the customers associated with these orders.

Upon checkout, a customer may, in accordance with other methods described herein, provide information identifying the order or the customer, which the POS then uses to request order information. The merchant system receives 1912 the request for order information and transmits 1914 to the POS the current order information, including the current purchase price as updated 1908 according to any price changes. The POS then receives the information and receives tender of payment of the current purchase price. The POS then transmits acknowledgment of payment to the merchant system 202a-202b. The acknowledgment of payment is received 1916 and, in response, fulfillment of the order is authorized 1918 or otherwise initiated.

Figure 20:
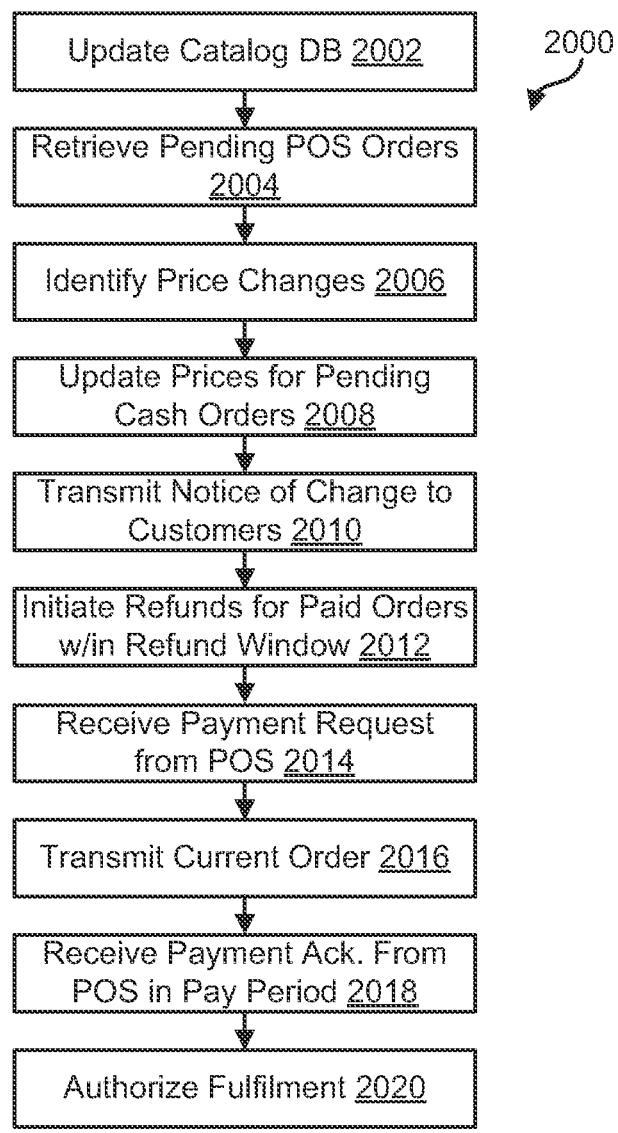
FIG. 20 is a process flow diagram of another method for processing reductions in price in accordance with an embodiment of the present invention.

FIG. 20 illustrates another method 2000 for adjusting the price for an order for which the POS payment method described herein has been selected by a customer. The method 2000 may be performed by one or more of a merchant system 202a-202b, POS, POS host, or other component. The method 2000 may include updating 2002 a catalog of items offered for sale by means of a web site. This may include any type of update operation such as adding items, changing item descriptions, or the like. In particular, updating 2002 may include updating the price for items in a catalog. Both price increases and decreases may be performed. The remaining steps of the method 2000 may be performed after each catalog update. In some embodiments, some or all of the remaining steps of the method 2000 may be performed as part of the catalog update process 2002, such as by the same script or software module. In some embodiments, some or all of the remaining steps of the method 2000 may be performed prior to changes to the catalog becoming effective.

The method 2000 may include retrieving 2004 or otherwise receiving 2004 pending online orders for which POS payment is the selected payment method. The orders retrieved 2004 may include orders with POS payment for which the order has been created but acknowledgment of payment has not yet been received from the POS. In the method 2000, pending orders may additionally include retrieving orders for which acknowledgment of payment has been received but the "refund window" has not yet expired. In some embodiments, for a period after one of payment and an end of the expiry period for tendering payment for an online order, a refund may be issued for price changes that occur within the refund window. In some embodiments, the refund window may include the window between a payment date and when an item actually ships from a fulfillment enter. In some embodiments, the refund window includes the latest of some or all of these events or dates.

Price changes between the purchase price of items as recorded in an order and the updated prices of the catalog may be identified 2006 and the purchase price for these items in the pending orders may be updated 2008 to reflect the current price. In some embodiments, all changes to the purchase price for items in an order may be recorded in a price change history for the order. This may be used to prevent duplicate price reductions. Notice of changes in price to pending orders may be transmitted 2010 to the customers associated with these orders.

The method 2000 may additionally include initiating 2012 refunds for orders that were both paid for within the refund window for the order and for which price changes were identified 2006 following payment. The refund may be processed according to any of the methods for processing refunds in response to a refund trigger as described hereinabove.

Upon checkout, a customer may, in accordance with other methods described herein, provide information identifying the order or the customer, which the POS then uses to request order information. The merchant system receives 2014 the request for order information and transmits 2016 the current order information, including the current purchase price as updated 2008 according to any price changes. The POS then receives the information and receives tender of payment of the current purchase price. The POS then transmits acknowledgment of payment to the merchant system 202a-202b. The acknowledgment of payment is received 2018 and in response, fulfillment of the order is authorized 2020 or otherwise initiated.

Figure 21:
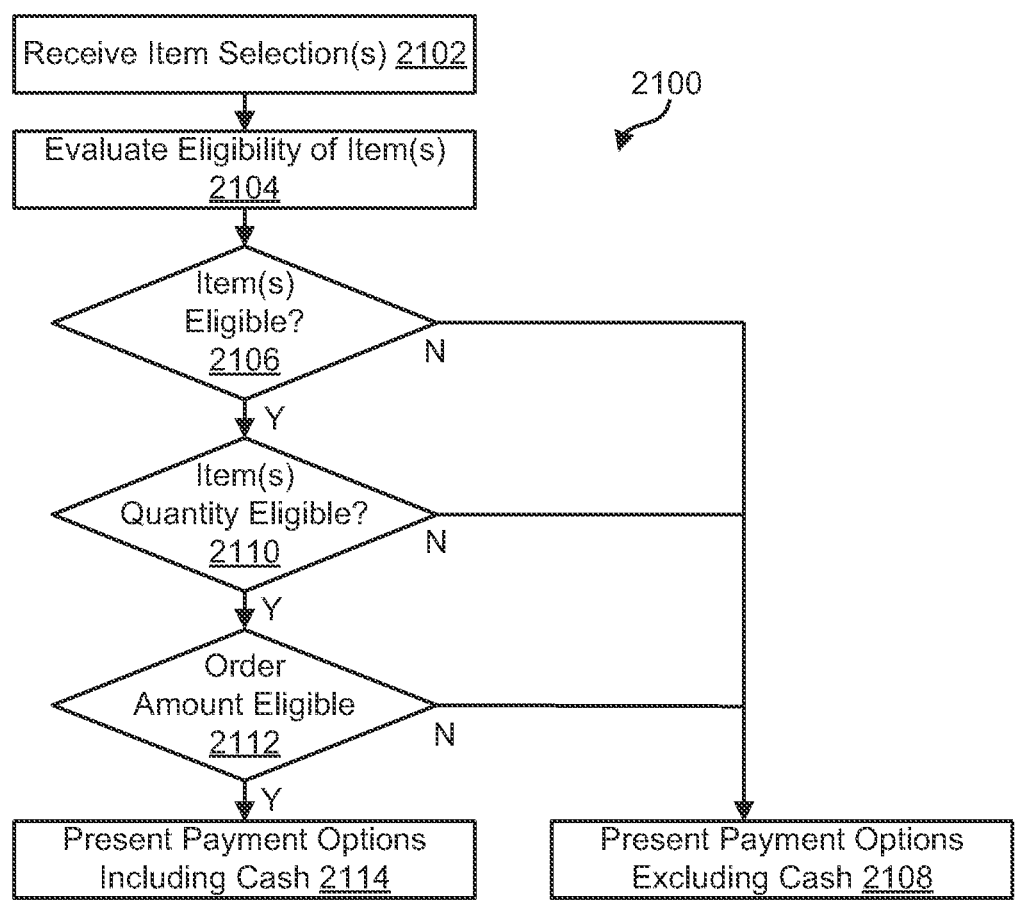
FIG. 21 is a process flow diagram of a method for determining eligibility of an online order for POS payment in accordance with an embodiment of the present invention.

FIG. 21 illustrates a method 2100 for evaluating the eligibility of an item for purchase by means of an online ordering with payment at an in-store POS. In some embodiments, in order to prevent abuse or gaming of systems and methods described herein, items may be flagged as ineligible for purchase online with payment at an in-store POS. For example, someone may maliciously order a large amount of items and then not pay for them. For example, high demand items at high demand times of the year may be flagged as ineligible in order to prevent unavailability (resulting from orders for which payment might not be received) of items for which customers are willing to pay immediately.

Accordingly, the method 2100 may include receiving 2102 a selection of one or more items from a customer. This may include adding items to an electronic shopping cart by a customer using a web browser, as known in the art of ecommerce. The eligibility of the items may be evaluated 2104. If one of the items is found 2106 to not be eligible, then at checkout or at other points in the online transactions, payment method options will be transmitted 2108 for presentation to the customer excluding an option to pay at a POS. Remaining options may include payment with a debit or credit card, using store credit, or some other means of electronic payment.

If the item is found 2106 to be eligible, the method 2100 may include evaluating 2110 the quantity of the item. This may include comparing the quantity to a threshold quantity for the item. If the quantity is not found to be eligible, then payment methods may be presented 2108. In some embodiments, the quantity used to determine eligibility may include aggregating quantities for multiple items in the order. For example, a global threshold for the amount of items that can be eligible may be defined for an individual order. In some embodiments, the quantity used to evaluate eligibility may include evaluating an aggregate quantity for the items in other pending, i.e., unpaid, orders for the customer associated with the order. In some embodiments, the quantity may include aggregating quantities of multiple items for all pending orders for the customer.

The method 2100 may include evaluating 2112 the order amount with respect to a threshold. If the amount exceeds the threshold, then payment options are presented 2108. As for the quantity, the order amount may include aggregating the amount due for all pending, i.e., unpaid, orders for the customer.

If the item(s), item quantities, and order amount are found to be eligible then payment methods are transmitted 2114 for display to the customer, where the payment methods include an option to pay for the order at a POS.

In some embodiments, more or less of the attributes evaluated in the method 2100 may be used to evaluate the eligibility of the order. In some embodiments, if a single item in an order is found to be ineligible, an entire order may be deemed ineligible.

Figure 22:
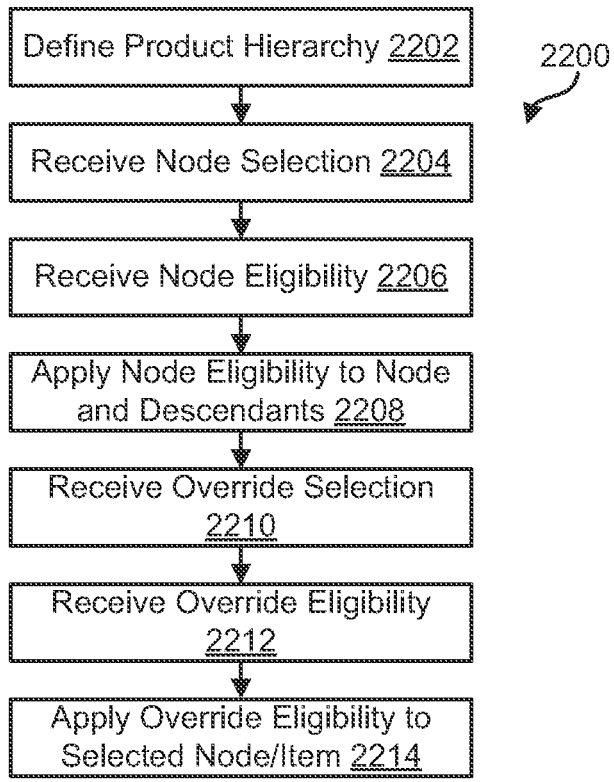
FIG. 22 is a process flow diagram of a method for specifying eligibility of an item for payment at a POS in an online transaction in accordance with an embodiment of the present invention.

FIG. 22 illustrates a method 2200 for specifying the eligibility of an item for purchase online with payment taking place at an in-store POS. The method 2200 may include defining 2202 a product hierarchy. Items offered for sale may be classified in a hierarchy of categories and subcategories. The hierarchy may include nodes that are a category or a subcategory of an item. Each node may have as descendants another node or a specific item.

To specify eligibility of items, selection of a node may be received 2204. An eligibility to be assigned to the node may also be received 2206. The eligibility may indicate one or more of whether the node and its descendants is or is not eligible, a quantity threshold, or an amount threshold for the node. The eligibility as defined for the node may then be applied 2208 for descendent nodes as well as items of the node. In some embodiments, application 2208 of eligibility may occur at the item, where a specific order is analyzed such as discussed below with respect to the method of FIG. 23.

The method 2200 may additionally include receiving override selection 2210 of a node or item as well as receiving overriding eligibility 2212 to be applied to the override selection. The eligibility for the override selection may indicate one or more of whether the selected item is not eligible or selected node and its descendants are not eligible, a quantity threshold, and an amount threshold for the node or item. The override may obviate any eligibility specified for a parent node in the hierarchy. The override eligibility may be applied 2214 to the node or item and any descendent nodes or items immediately after it is received 2212, at the time eligibility of an order is determined (e.g., the method 2100), or at some other time.

Figure 23:
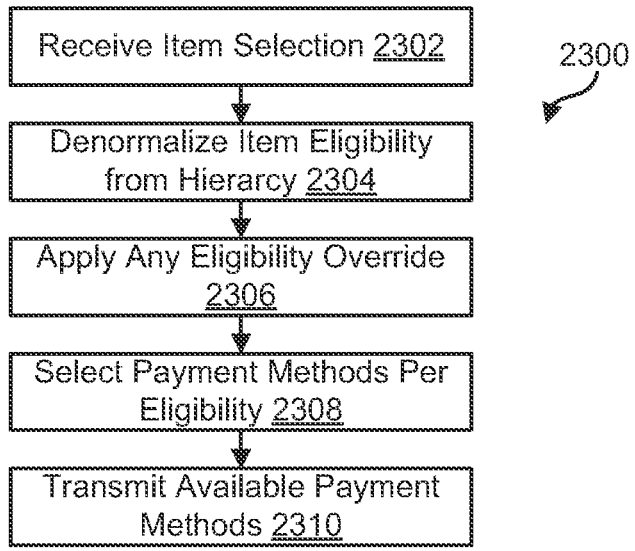
FIG. 23 is a process flow diagram of a method for determining the eligibility of an item in an item hierarchy in accordance with an embodiment of the present invention.

FIG. 23 illustrates a method 2300 for determining the eligibility of an item for online ordering with payment provided at an in-store POS. The method 2300 may include receiving 2302 a selection of one or more items from a customer. This may include receiving the selection from a web browser displayed to the customer on a client device.

An item hierarchy, as discussed above, may be denormalized 2304 or otherwise traversed to determine the eligibility of the item. As noted above, an eligibility specification applied to a node of the hierarchy may also be applied to descendent nodes. Accordingly, the hierarchy may be analyzed to determine whether any eligibility restriction has been applied to a parent node of any of the selected items. This may include traversing up the hierarchy until a node with an eligibility restriction is encountered. In some embodiments, a hierarchy "path" may be stored as part of an item record indicating the path from an item up through the nodes of the hierarchy to a root node, such that traversal is not necessary. In such embodiments, the nodes of the path may be analyzed from specific to general until an eligibility restriction is encountered. Any other method for traversing a hierarchy may also be used to determine the item eligibility.

The method may further include applying an override 2306. In some embodiments, as noted above, an eligibility specification may be defined specifically for an item or node that overrides eligibility specification for a parent node. Accordingly, the eligibility determined 2304 according to the hierarchy may be overridden according to application 2306 of the override for an item based on any override definitions. An override specification may impose additional restrictions as to one or more of eligibility, quantity eligibility, or amount eligibility. An override specification may also impose fewer eligibility restrictions.

In some embodiments, the order of steps 2304 and 2306 may be altered. For example, if an override has been defined, it may be applied 2306 and analysis of any eligibility defined for the hierarchy, or higher levels of the hierarchy, may be omitted. If no override is defined, then step 2304 may be performed.

One or more payment methods may be selected 2308 according to the eligibility specification determined for the item based on one or both of steps 2304 and 2306. This may include determining eligibility of the items of the order or determining the eligibility of the order as a whole, such as according to the method 2100. The selected payment methods may then be transmitted 2310 for display to a customer for selection by the customer for payment of the order.

Figure 24:
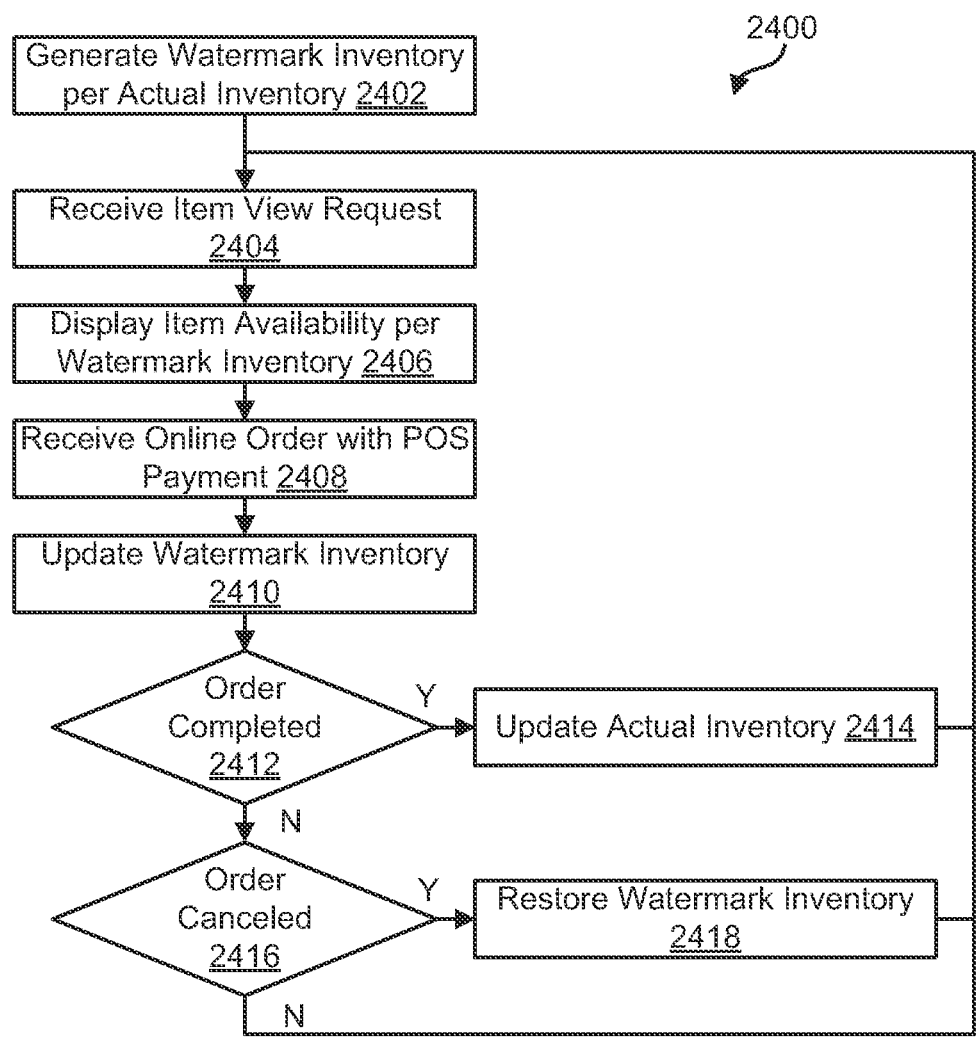
FIG. 24 is a process flow diagram of a method for managing inventory associated with online orders with payment taking place at a POS in accordance with an embodiment of the present invention.

FIG. 24 illustrates a method 2400 for managing inventory in a system that permits a customer to make an online order and pay for the order at an in-store POS according to the methods described herein. The method 2400 may be executed by a component of the merchant system 202a-202b.

The method 2400 may include generating a watermark inventory according to an actual inventory. This may include simply making a copy of the actual inventory. The inventory may list items and the quantity of items available for sale. Portions of the inventory may be associated with individual fulfillment or storage facilities. As noted above, upon acknowledgment of payment, orders may be assigned to such a facility for fulfillment. The inventory may also include information on expected inflows of items due to receipt of shipments and expected outflows due to orders that have been paid for but not shipped.

A customer by means of a browser or other component may request to view information about an item. This request is received 2404. Information about the item may be transmitted 2406 to the customer for display. The transmitted information may include an item description and/or the availability of the item according to the watermark inventory. The availability information may include an absolute availability per the watermark inventory, i.e., the item is or is not available, or an availability date per the watermark inventory, i.e., the item is available for purchase now or available as of some future date. The transmitted information may also include a purchase price.

As noted above, in some embodiments, eligibility of an item for purchase by means of online ordering with payment at a POS may be evaluated. In some embodiments, the quantity of an item that can be eligible for purchase in this manner may be evaluated based on both available inventory and a threshold quantity for the item. For example, the threshold against which a proposed quantity is compared to determine eligibility may be dynamically changed according to available inventory, i.e., reduced as inventory gets low and increased if inventory is high. In some embodiments, the watermark inventory may be used for determining how to alter the threshold, and in others, the actual inventory may be used.

The method 2400 may further include receiving 2408 an online order for the item that includes a request to pay for the item at an in-store POS. Upon receiving 2408 such an order, the watermark inventory is updated 2410 to indicate that the item is not available for purchase. This may include simply decrementing the number available for purchase. If the order is found 2412 to be completed, such as after receiving acknowledgment of payment from a POS as described herein, then the actual inventory may be updated 2414 to indicate that the item is no longer available. This may include decrementing the number of units of the item available in the actual inventory.

If the order is found 2416 to have been canceled, then the watermark inventory may be restored 2418. This may include increasing the number of units of the item available for sale. Cancellation may be due to express cancellation by the customer or cancellation due to failure to pay for the order at a POS within the pay period as described hereinabove.

Figure 25:
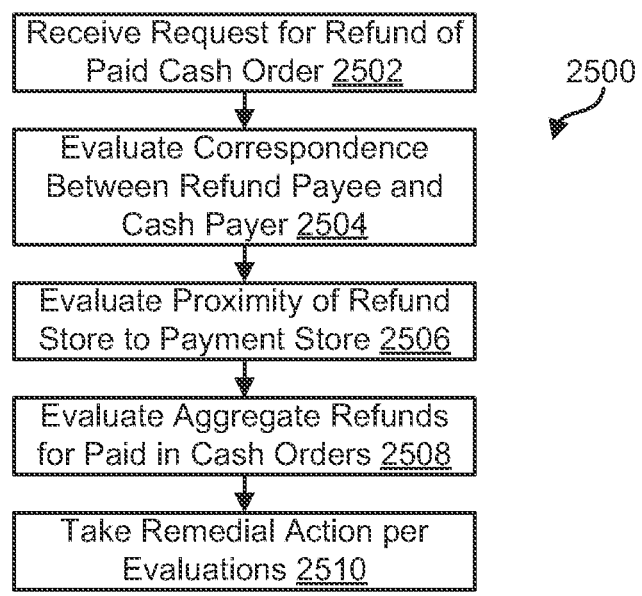
FIG. 25 is a process flow diagram of a method for preventing fraud and abuse in accordance with an embodiment of the present invention.

FIG. 25 illustrates a method 2500 for preventing fraud and abuse of systems that allow for online orders to be paid for at an in-store POS. As already noted above, eligibility restrictions for items as well as restrictions as to the number of items or amount of an order may be implemented to prevent fraud and abuse and otherwise prevent harm to a merchant due to unpaid orders tying up inventory.

The method 2500 may be used to evaluate customer activity to detect potentially fraudulent activity. In particular, the method 2500 may be used to prevent usage of the systems and methods described herein to transfer funds from one party to another.

The method 2500 may include receiving 2502 a request for a refund for an order for which payment was received at a POS. This may include receiving a refund triggering event as described hereinabove. As noted above, information such as refund preference and a pick-up person may be specified by a customer account or input by the customer at the time an order is made or a refund is requested. The method 2500 may include evaluating 2504 correspondence between a refund payee and the payer that paid at a POS for the order. If the payee and the payer are different, then a flag may be set. In some embodiments, a relationship between the payer and payee may be evaluated, such as whether they share a last name or if there is any publicly available indication of a relationship between them. This may include evaluating publicly available social site information or other searchable information on the Internet. The flag may be cleared if an apparent personal relationship exists between the payer and payee.

A proximity between a payment store, i.e., the store where payment was tendered, and a refund store may be evaluated 2506. In some embodiments, a customer may be required to specify a choice of refund stores at which a cash refund is to be received. For example, a list of stores at which a cash refund may be received may be transmitted for display to the customer, and a selection of one or more of the stores may be received as the customer's designation of a refund store. If this store is not within a distance threshold of the location where payment was tendered, then a flag may be set or the choice of refund stores may be prohibited. In some embodiments, only those stores within a threshold distance from the payment store may be transmitted for display and selection. In other embodiments, a customer selection of a refund store is evaluated and the customer is notified that the selection is not appropriate if the selected store is not within the threshold distance from the payment store.

Alternatively or additionally, the evaluation of a customer's selection of a refund store may be performed once an attempt to obtain a refund is made at a particular store, such as according to the methods described herein. The proximity of this store to the store where payment was made may therefore be evaluated 2506 as part of processing the refund. In such embodiments, requests for cash refunds originating at a POS that is not within a proscribed proximity to the store where payment was made may be denied.

In some embodiments, an aggregation of refunds associated with the customer making the request for refund may be evaluated 2508. If the customer has a pattern of making orders, paying for them, and then requesting refunds, a flag may be set. In some embodiments, the customer may be flagged as ineligible for making online orders having POS payment as the selected payment method if the aggregate amount exceeds a threshold. In some embodiments, the aggregate amount of refunds for online orders with POS payment option within a certain time period, such as a week or month, may be compared to a threshold. If the amount of refunds paid out exceeds this threshold, a flag may be set. In some embodiments, the aggregate amount of refunds paid out at an in-store POS may be compared to a threshold and the customer may be flagged as ineligible if this threshold is exceeded.

Accordingly, if a customer is flagged as ineligible, for future orders the customer will no longer be presented with the option to pay for an online order at a POS. In some embodiments, the number of refund requests may likewise be aggregated and compared to a threshold and used to flag the order or flag the customer as ineligible in the same manner as for the amount threshold.

The method 2500 may further include taking remedial action according to flags set based on any of the evaluations mentioned herein that may indicate fraud or abuse of the system. Remedial action may include limiting the stores at which a cash refund will be paid to those within a threshold distance of the store where payment was received, as noted above. Remedial action may also include limiting the refund to store credit. For this option, refund terms indicating this potential limitation may be communicated to the customer prior to payment. Remedial action may further include requiring the payee to be an individual rather than a business or financial institution.

Remedial action may also include requiring that the payee present identification upon pick up of a cash refund verifying that the payee is identical to the individual that provided payment. In such embodiments, the identity of the payee may be verified at the POS and transmitted to the merchant system 202a-202b before or after payment is received. Authorization to provide the refund may be transmitted to the POS only after verification of the payee's identity is received. In other embodiments, instructions to provide the refund may be transmitted to the POS only upon verification of the payee's identity as identical to the payer's identity.

The functionality of the systems and methods described herein may be divided between different parties. For example, the merchant system 202a-202b may be owned or controlled by a different entity than the entity owning or controlling the POS or POS host. Likewise, the components of FIG. 3 may each be owned or controlled by the same or different entities. Accordingly, the methods described herein may additionally include authentication steps whereby the POS authenticates itself to the merchant system 202a-202b when transmitting acknowledgment of payment and where the merchant system 202a-202b authenticates itself when communicating with the POS.

Likewise, additional steps for transferring funds between entities may be provided. For example, upon receiving payment at a POS for an order, an entity owning or controlling the POS may electronically transfer funds to an entity corresponding to the order. The transfer may occur for each order, or a monthly, weekly, or other interval transfer may occur for all transactions in a given period. In some embodiments, a clearing house wherein payments received on behalf of an entity are offset by payments due from the entity in order to reduce the amount of money transferred between entities.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for managing online transactions comprising:
   receiving, by a server, an online order from a customer for an item having a purchase price associated therewith, the item corresponding to an item record for a product offered for sale, the item record including an item identifier and pricing information;

evaluating, by the server, eligibility of the item for in-store point of sale (POS) payment by:
  evaluating an eligibility for in-store POS payment of an ancestor node of the item record in a product hierarchy, the item record being a node in the product hierarchy and having a plurality of ancestor nodes each representing a classification of the product, the ancestor node being one of the plurality of ancestor nodes and the eligibility for in-store POS payment of the ancestor node applicable to descendent nodes of the ancestor node;
  evaluating an override applicable to the item; and
  evaluating at least one of a quantity of the item in the online order with respect to a quantity threshold and a cost of the item with respect to a cost threshold; and
  determining the item to be eligible for in-store (POS) payment only if both a) at least one of the evaluating the eligibility of the ancestor node for in-store POS payment and evaluating the override applicable to the item indicate the item is eligible and b) the evaluating the at least one of the quantity of the item and the cost of the item indicate the item is eligible;
transmitting, by the server, for display to the customer, payment options including an in-store POS payment option in response to determining the item to be eligible for in-store POS payment;
receiving, by the server, acknowledgment of payment at a point of sale (POS) for the online order only if the payment options include the in-store POS payment option;
receiving, by the server, a request for a refund for the online order ;
evaluating, by the server, refund activity of the customer for abuse; and
selecting, by the server, both of a refund method and a POS location according to the evaluating of the refund activity of the customer;
determining that the refund activity of the customer indicates abusive activity; and
in response to determining that the refund activity of the customer indicates abusive activity, limiting the POS location for payment of a cash refund to stores within a threshold proximity from a store from which the acknowledgment of payment at the POS was received.

2. The method of claim 1, further comprising:
limiting the refund method to a mailed check according to the evaluating of the refund activity of the customer.

3. The method of claim 1, further comprising:
limiting the refund method to an in-store POS cash refund according to the evaluating of the refund activity of the customer.

4. The method of claim 1, wherein evaluating refund activity of the customer for abuse further comprises evaluating with respect to an amount threshold an amount of refunds issued for orders of the customer.

5. The method of claim 4, wherein evaluating with respect to the amount threshold the amount of refunds issued for the orders of the customer, further comprises:
calculating an aggregate amount by aggregating amounts of a plurality of refunds issued in a refund window for the orders of the customer for which acknowledgment of payment has been received from a POS; and
evaluating, with respect to the amount threshold, the aggregate amount.

6. The method of claim 1, wherein evaluating refund activity of the customer for abuse further comprises:
receiving a refund payee; and
evaluating the refund payee with respect to a payer corresponding to the acknowledgment of payment received from the POS.

7. A system for managing online transactions comprising one or more processors and one or more memory devices operably coupled to the one or more processors, the one or more memory devices storing executable and operational data effective to cause the one or more processors to:
receive an online order from a customer for an item having a purchase price associated therewith, the item being a product offered for sale at the purchase price;
evaluate eligibility of the item for cash payment by:
  evaluating an eligibility for in-store point of sale payment of an ancestor node of the item in a product hierarchy, the eligibility applicable to descendent nodes of the ancestor node, the item being a node in the product hierarchy and the ancestor being one of a plurality of ancestor nodes of the item in the product hierarchy, each ancestor node of the plurality of ancestor nodes representing a classification of the product;
  evaluating an override applicable to the item; and
  evaluating at least one of a quantity of the item in the online order with respect to a quantity threshold and a cost of the item with respect to a cost threshold;
  determining the item to be eligible for in-store POS payment only if both of a) at least one of the evaluating the eligibility of the ancestor node and evaluating the override applicable to the item indicate the item is eligible and b) evaluating the at least one of the quantity of the item and the cost of the item indicate the item is eligible
transmit for display to the customer, payment options including a cash payment option only if the item is determined to be eligible according to the evaluating of eligibility;
receive acknowledgment of payment at a point of sale (POS) for the online order only if the payment options include the cash payment option;
receive a request for a refund for the online order of the customer;
evaluate refund activity of the customer for abuse;
select both of a refund method and a POS location according to the evaluation of refund activity of the customer;
determine that the refund activity of the customer indicates abusive activity; and
in response to determining that the refund activity of the customer indicates abusive activity, limit the POS location for payment of a cash refund to stores within a threshold proximity from a store from which the acknowledgment of payment at the POS was received.

8. The system of claim 7, wherein the executable and operational data are further effective to cause the one or more processors to limit the refund method to a mailed check according to the evaluation of the refund activity of the customer.

9. The system of claim 7, wherein the executable and operational data are further effective to cause the one or more processors to limit the refund method to a cash refund at the POS according to the evaluation of the refund activity of the customer.

10. The system of claim 7, wherein the executable and operational data are further effective to cause the one or more processors to evaluate the refund activity of the customer for abuse by evaluating with respect to an amount threshold an amount of refunds issued for orders of the customer.

11. The system of claim 10, wherein the executable and operational data are further effective to cause the one or more processors to evaluate with respect to the threshold the amount of refunds issued for prior orders of the customer preceding the online order by:
    calculating an aggregate amount by aggregating amounts of a plurality of refunds issued in a refund window for the prior orders of the customer for which acknowledgment of in-store POS payment has been received; and
    evaluating, with respect to the threshold, the aggregate amount.

12. The system of claim 7, wherein the executable and operational data are further effective to cause the one or more processors to perform the evaluating refund activity of the customer for abuse by:
    receiving a refund payee; and
    evaluating the refund payee with respect to a payer corresponding to the acknowledgment of payment received from the POS.

13. A computer program product for managing a transaction, the computer program product being embodied in a non-transitory computer readable storage medium and comprising computer instructions for:
    receiving an online order from a customer for an item having a purchase price associated therewith, the item being a product offered for sale at the purchase price;
    evaluating eligibility of the item for in-store point of sale (POS) payment by:
        evaluating an eligibility of an ancestor node of the item in a product hierarchy, the eligibility applicable to descendent nodes of the ancestor node, the item being a node in the product hierarchy and having a plurality of ancestor nodes including the ancestor node, the plurality of ancestor nodes each representing a product classification to which the item belongs;
    evaluating an override applicable to the item;
    evaluating at least one of a quantity of the item in the online order with respect to a quantity threshold and a cost of the item with respect to a cost threshold; and
    determining the item to be eligible for in-store point of sale POS payment only if at least one of the evaluating the eligibility of the ancestor node and evaluating the override applicable to the item indicate the item is eligible and evaluating the at least one of the quantity of the item and the cost of the item indicate the item is eligible
    transmitting, by the server, for display to the customer, payment options including a cash payment option only if the item is determined to be eligible according to the evaluating of eligibility;
    receiving, by the server, acknowledgment of payment at a point of sale (POS) for the online order only if the payment options include the cash payment option;
    receiving a request for a refund for the online order of the customer;
    evaluating refund activity of the customer for abuse;
    selecting both of a refund method and a POS location according to the evaluation of refund activity of the customer for abuse;
    determining that the refund activity of the customer indicates abusive activity; and
    in response to determining that the refund activity of the customer indicates abusive activity, limiting the POS location for payment of a cash refund to stores within a threshold proximity from a store from which the acknowledgment of payment at the POS was received.

14. The computer program product of claim 13, further comprising computer instructions for:
    limiting the refund method to a cash refund at the POS according to the evaluation of the refund activity of the customer.

15. The computer program product of claim 13, wherein evaluating refund activity of the customer for abuse further comprises evaluating with respect to a refund threshold an amount of refunds issued for prior orders of the customer.

16. The computer program product of claim 15, wherein evaluating with respect to the refund threshold the amount of refunds issued for the prior orders of the customer, further comprises:
    calculating an aggregate amount by aggregating amounts of a plurality of refunds issued in a refund window for the prior orders of the customer for which acknowledgment of in-store POS payment has been received; and
    evaluating, with respect to the refund threshold, the aggregate amount.

17. The computer program product of claim 13, wherein evaluating refund activity of the customer for abuse further comprises:
    receiving a refund payee; and
    evaluating the refund payee with respect to a payer corresponding to the acknowledgment of payment received from the POS.

\* \* \* \* \*